United States Patent
Crouch et al.

(10) Patent No.: US 12,210,618 B2
(45) Date of Patent: Jan. 28, 2025

(54) METHOD AND SYSTEM FOR INSERTION OF CYBERSECURITY AND HARDWARE ASSURANCE INSTRUMENTS WITHIN INTERGRATED CIRCUITS AND ELECTRONIC SYSTEMS USING MULTI-STAGE HARDWARE MARKING

(71) Applicant: Amida Technology Solutions, Inc., Washington, DC (US)

(72) Inventors: Alfred Larry Crouch, Cedar Park, TX (US); Peter Lawrence Levin, Silver Spring, MD (US); John David Akin, Plano, TX (US); Adam Wade Ley, Allen, TX (US); Matthew McKinnon Ritonia, Arlington, VA (US); Wesley Layton Ellington, Dallas, TX (US); Maria Anne Spasojevic, Palo Alto, CA (US)

(73) Assignee: Amida Technology Solutions, Inc., Washington, DC (US)

( * ) Notice: Subject to any disclaimer, the term of this patent is extended or adjusted under 35 U.S.C. 154(b) by 657 days.

(21) Appl. No.: 17/540,637

(22) Filed: Dec. 2, 2021

(65) Prior Publication Data
US 2022/0164437 A1    May 26, 2022

Related U.S. Application Data

(63) Continuation of application No. 16/145,891, filed on Sep. 28, 2018, now Pat. No. 11,681,795.

(51) Int. Cl.
*G06F 7/04* (2006.01)
*G06F 21/55* (2013.01)

(52) U.S. Cl.
CPC .......... *G06F 21/552* (2013.01); *G06F 21/554* (2013.01); *G06F 2221/034* (2013.01)

(58) Field of Classification Search
CPC ................ G06F 21/552; G06F 21/554; G06F 2221/034; G06F 21/55; G06F 21/561;
(Continued)

(56) References Cited

U.S. PATENT DOCUMENTS

2013/0055174 A1* 2/2013 Boehm ................... G06F 30/33
716/108
2016/0267209 A1* 9/2016 Ikram ..................... G06F 30/30

OTHER PUBLICATIONS

Ardeshiricham et al., Register Transfer Level Information Flow Tracking for Provably Secure Hardware Design, IEEE, May 31, 2017, pp. 1691-1696. (Year: 2017).*

(Continued)

*Primary Examiner* — Philip J Chea
*Assistant Examiner* — Jenise E Jackson
(74) *Attorney, Agent, or Firm* — Artie Pennington Law Offices, PLLC; Artie Pennington; Hannah Ward

(57) ABSTRACT

A hardware trojan security system may perform a computer implemented method to secure an electronic facility in relation to a hardware trojan, by performing a trojan vulnerability analysis, locating an instrument site location, identifying a selected instrument in relation to an effect of the trojan, marking instrument control-side markers and instrument operative-side markers, marking facility model control-side markers and facility model operative-side markers, marking access architecture control-side markers, and connecting the instrument with the facility model and access architecture by matching corresponding markers.

20 Claims, 15 Drawing Sheets

(58) Field of Classification Search
CPC ......... H04L 9/002; H04L 9/003; H04L 9/004; H04L 9/005; H04L 63/1433
See application file for complete search history.

(56) References Cited

OTHER PUBLICATIONS

Bhunia et al., Hardware Trojan Attacks: Threat Analysis and Countermeasures, IEEE, Aug. 8, 2014, pp. 1229-1247. (Year: 2014).*

* cited by examiner

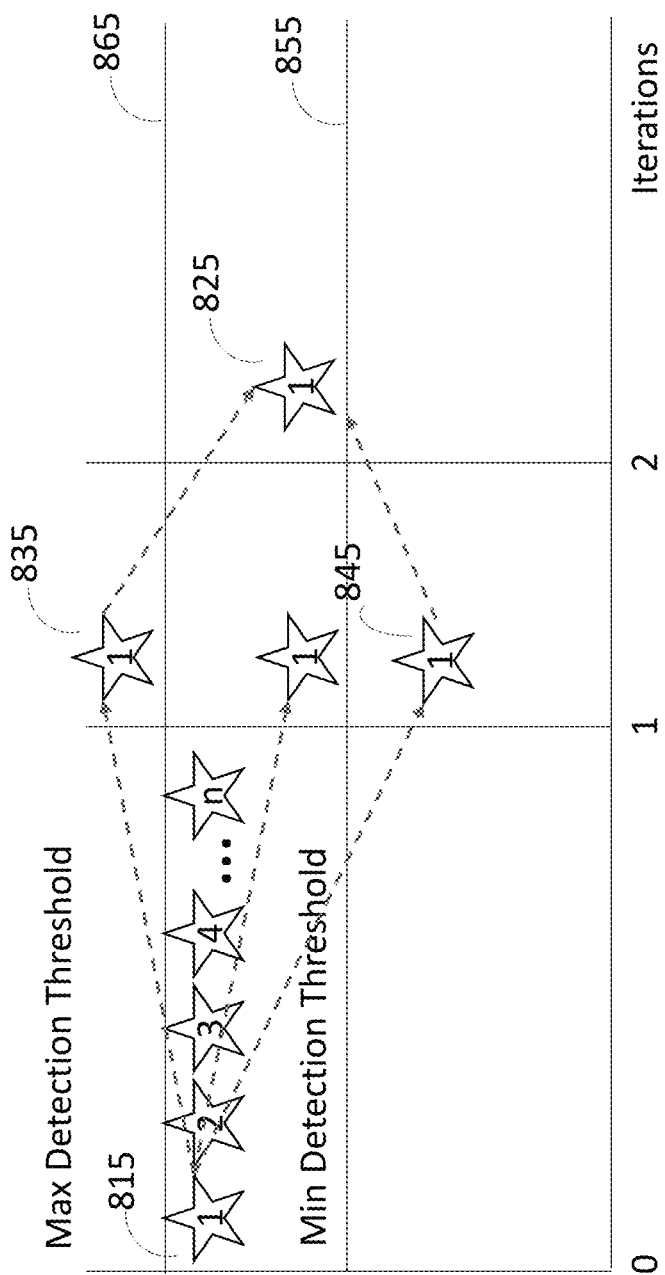

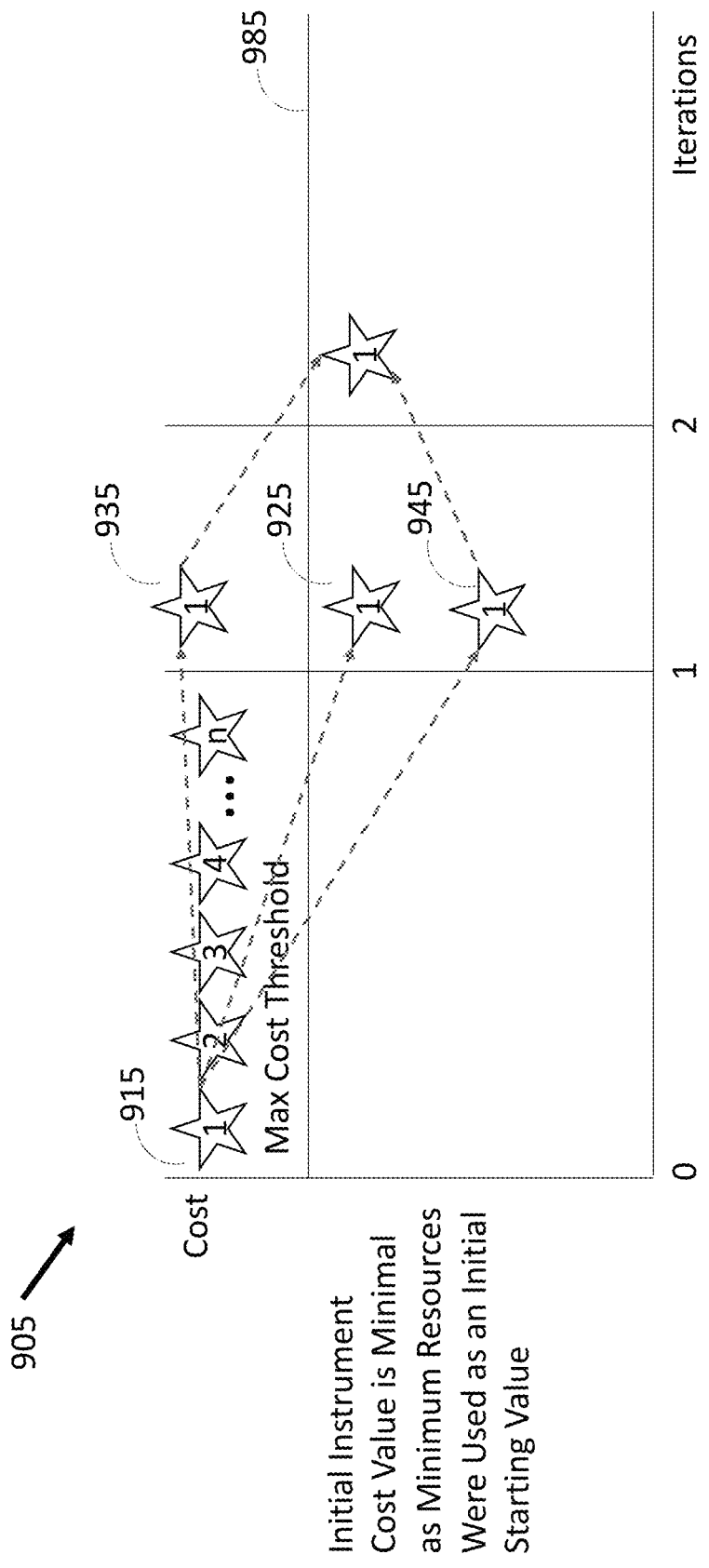

METHOD AND SYSTEM FOR INSERTION OF CYBERSECURITY AND HARDWARE ASSURANCE INSTRUMENTS WITHIN INTERGRATED CIRCUITS AND ELECTRONIC SYSTEMS USING MULTI-STAGE HARDWARE MARKING

CROSS REFERENCE TO RELATED APPLICATIONS

This application is a continuation of U.S. Non-provisional patent application Ser. No. 16/145,891, filed 28 Sep. 2018, entitled "Method, System and Apparatus for Security Assurance, Protection, Monitoring and Analysis of Integrated Circuits and Electronic Systems in Relation to Hardware Trojans" ("First Parent Application");

This application is a continuation of U.S. Non-provisional patent application Ser. No. 16/450,336, filed 24 Jun. 2019, entitled "Method, System and Apparatus for Security Assurance, Protection, Monitoring and Analysis of Integrated Circuits and Electronic Systems in Relation to Hardware Trojans" ("Second Parent Application");

This application is a continuation of U.S. Non-provisional patent application Ser. No. 17/134,438, filed 27 Dec. 2020, entitled "Method, System and Apparatus for Security Assurance, Protection, Monitoring and Analysis of Integrated Circuits and Electronic Systems Using Machine Learning Instruments and Machine Learning Analysis" ("Third Parent Application";

This application is a continuation of U.S. Non-provisional patent application Ser. No. 17/134,441, filed 27 Dec. 2020, entitled "Method, System and Apparatus for Verification of Operation Using GPS Receiver Input Within Integrated Circuits and Electronic Systems Using an Operation Navigation System" ("Fourth Parent Application");

This application is related to U.S. Non-provisional patent application Ser. No. 16/775,658, filed 29 Jan. 2020, now U.S. Pat. No. 10,909,284, issued 2 Feb. 2021, entitled "Method and System for Selection of Location for Placement of Trojans, Triggers and Instruments Within Integrated Circuits and Electronic Systems Using Weighted Controllability and Observability Analysis" ("First Related Application"); and This application is related to U.S. Non-provisional patent application Ser. No. 16/732,236, filed 31 Dec. 2019, now U.S. Pat. No. 11,157,619, issued 26 Oct. 2021, entitled "Method and System for Selection of Location for Placement of Trojans, Triggers and Instruments Within Integrated Circuits and Electronic Systems Using Contributory Operation Analysis" ("Second Related Application");

This application claims priority to the First Parent Application, Second Parent Application, Third Parent Application, and Fourth Parent Application, and hereby claims benefit of the filing dates thereof pursuant to 37 C.F.R. § 1.78(a)(4).

The subject matter of each of the First Parent Application, Second Parent Application, Third Parent Application, Fourth Parent Application, First Related Application and Second Related Application, is expressly incorporated herein by reference in entirety.

FIELD OF THE INVENTION

The disclosure relates generally to methods, systems, and apparatus for security assurance, protection, monitoring, and analysis of integrated circuits and electronic systems in relation to hardware trojans, and the design, manufacture and use of same. More particularly, the disclosure relates to insertion of embedded instruments in an electronic facility to secure the facility in relation to hardware trojans.

BACKGROUND OF THE INVENTION

In general, in the descriptions that follow, the first occurrence of each special term of art that should be familiar to those skilled in the art of integrated circuits ("ICs") and systems will be italicized. In addition, when a term that may be new or that may be used in a context that may be new, that term will be set forth in bold and at least one appropriate definition for that term will be provided. In addition, throughout this description, the terms assert and negate may be used when referring to the rendering of a signal, signal flag, status bit, or similar apparatus into its logically true or logically false state, respectively, and the term toggle to indicate the logical inversion of a signal from one logical state to the other. Alternatively, the mutually exclusive Boolean states may be referred to as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

Hereinafter, reference to a facility shall mean a circuit or an associated set of circuits adapted to perform a particular function regardless of the physical layout of an embodiment thereof. Thus, the electronic elements comprising a given facility may be instantiated in the form of a hard macro adapted to be placed as a physically contiguous module, or in the form of a soft macro, the elements of which may be distributed in any appropriate way that meets speed path requirements. In general, electronic systems comprise many different types of facilities, each adapted to perform specific functions in accordance with the intended capabilities of each system. Depending on the intended system application, the several facilities comprising the hardware platform may be integrated onto a single IC or distributed across multiple ICs. Depending on cost and other known considerations, the electronic components, including the facility-instantiating IC(s), may be embodied in one or more single- or multi-chip packages. However, unless expressly stated to the contrary, the form of instantiation of any facility shall be considered as being purely a matter of design choice.

Electronic systems and facilities including circuits such as integrated circuits, chips, circuit boards, electronic devices, and components thereof, are subject to attacks and intrusions from malicious content or hardware trojans (hereinafter, collectively "hardware trojans") introduced by malign actors ("black hats"). As used herein, the term "hardware trojan" includes inherent malicious content or elements that may be included in a facility, and that may be exploited. For clarity, hardware trojans, as referenced herein, are to be distinguished from software trojans and related malicious software.

Hardware trojans, for example, may intend to function to break or prevent normal operation, allow unauthorized taking over or locking, steal data, steal circuit structure, degrade the hardware, degrade circuit operations, or inject errors into data being processed. A non-exhaustive listing of labels or references for hardware trojans includes, without limitation, the following: "denial of service" (DoS) indicating preventing the integrated circuit from conducting its normal function for some period of time; "ransomware" indicating the taking over or locking of an integrated circuit until a payment is extracted; "data theft" indicating that critical information stored or processed within the integrated circuit has been exfiltrated (such as, for example, customer information, account numbers and account passwords that can be used for identity theft and to access financial accounts); "structure theft" indicating that design or operation information concerning the electronic system or facility thereof has been exposed to enable reverse-engineering or counterfeiting; and "destructive operation" indicating that a facility or electronic system may be operated in such a manner as to provide physical damage (for example, operating built-in self-test logic ((BIST)) until a facility goes into thermal overload and physically melts).

The capability to allow these types of attacks stems from inadvertent or intentionally malicious content (i.e., "hardware trojans") included within the facility hardware, such as integrated circuit hardware. Instantiations of malicious content, both inadvertent and intentional, may be labeled or referenced by several names, but may be generally referred to as "security vulnerabilities" or "security exploits" (hereinafter, collectively, "security exploits"). Security exploits may be incorporated within a facility, or within an electronic system including a facility, at any point in design, development, integration, implementation, testing, programming, packaging, and distribution; or at any point in the design-manufacturing-distribution supply chain.

In the age of the internet, the internet-of-things ("IoT"), and ubiquitous home and business electronics, the prevalence of cyberattacks has become a key concern of many owners and users of those electronics. Many attacks source from, and make use of, the connection to the internet. Often overlooked, however, are the hardware trojans hidden, and embedded, and/or built right into the electronic hardware, i.e., trojan attacks. A trojan attack is the inclusion of hardware trojans within an electronic device. The trojan attack becomes realized when the trojan is activated and delivers its designated payload or takes its designated action. Trojans may be "always on" or may be triggered or activated by an event.

Trojans may be inserted into the electronic devices and systems at many different phases that include by way of example the design and development phase, the manufacturing phase, and the assembly phase. By way of example, trojan attacks may include non-specified features added to an original design, nefarious functions within a counterfeit function that is added to the design, e.g., IP cores within a semiconductor design, or that replaces a unit or device within the overall system, e.g., a counterfeit semiconductor device placed on a board.

More specifically, hardware trojans may be introduced into a facility, for example, when intellectual property ("IP") cores ("IP cores") are licensed from third parties for incorporation in an integrated circuit design. IP cores may include hidden trojans providing various security exploits. So, for example, a design engineer acting with a nefarious purpose may include one or more trojans to perform undesired functions, such as providing unsecured or readily enabled back-door access or memory space for future software viruses and malware. A design engineer also may use electronic design automation (EDA) tools that generate, insert or synthesize circuit content, such as test, safety, process monitoring and debug logic, that may be modified to generate or include hardware trojans. A design engineer may design tools or provide implementations that operate on one form of design model to create a different, undesired form of design model. By way of example, logic synthesis from a behavioral model to a gate-level model may be mapped to the gate library that targets a specific fabrication facility. By way of a different example, design tools may provide a place-and-route conversion from a gate-level model to a physical model that adds and includes power, clock, electrostatic-discharge ("ESD") protection structures, and those design tools may be corrupted by being designed to add hidden malicious content during the conversions or by ignoring conversion rules or design rules to allow weaknesses or vulnerabilities to exist that would normally be caught and removed.

Other means of trojan insertion include some scenarios where a circuit design may be passing through the fabrication process, e.g., in an IC foundry, and subtle changes in doping and chemical exposure may result in transistors, gates, signal routes and insulation layers not behaving properly in the final implemented silicon device. By way of example, the impacted elements may be sensitive to voltage levels or temperature levels or temperature ranges or may produce unexpected emissions. By way of a different example, during the IC testing process, a programming step may place identification numbers or encryption codes or other defining steps for the integrated circuit device, and the test process may be altered to either provide incorrect values or may place the values in alternate places within the device, where the misplaced values may be snooped or leaked in the future. Even when the sliced-and-diced silicon is packaged into plastic or ceramic chip carriers, devices may have unused signal connections or unused functions connected to package pins to be accessed by nefarious parties in the future. By way of example, a package pin may be accessed and act as a signal connection to leak data but may be misidentified in the IC data book as a ground connection.

Hardware trojans may be incorporated within custom designs such as, for example, application specific integrated circuits ("ASIC"), or may be incorporated within designs destined to become standard parts. Examples may include application specific standard parts ("ASSP"), microprocessors, microcontrollers, systems-on-a-chip ("SOC"), and standardized memory chips ("DDR", "DIMB", "HBM", etc.). When electronic systems are made from these chips, either custom systems made from custom ICs or systems made from commercial-off-the-shelf ICs (COTS), there is a risk that one or multiple chips incorporated into the electronic design may be compromised, or that groupings of chips can be arranged together to allow access to trojan malicious content at the system level or to create complex trojan malicious content at the system level. In an example, a hardware trojan may provide back door access to secured kernel memory that holds a primary operating system.

Electronics manufacturers, producers, and providers generally consider three basic strategies for addressing cybersecurity threats when providing electronic devices and systems. As a first strategy, the provider can ignore adding or supporting any cybersecurity techniques and content if they believe that their electronics are inconsequential, e.g., not important enough to warrant an attack by nefarious individuals, industrial enemies or nation-states. This first strategy may also be used if they have consequential electronics and simply do not wish to invest in any cybersecurity techniques due to the expense involved or the belief that the probability of a cyberattack is minimal. The second strategy that may be considered is to establish a defensive position that requires detecting the trojans and their triggers before they can activate and deliver their payload. And finally, the third strategy that may be considered is to assume that all electronics are infected and to invest in post-attack recovery techniques.

The first strategy of ignoring cyber-hardening has been illustrated ineffectual because this strategy does not take into consideration that even inconsequential electronics such as TVs, DVRs, cameras, thermostats, light bulbs and household appliances may be used as BOTs to conduct distributed denial-of-service ("DDOS") or Domain-Name-Server ("DNS") attacks.

A defensive second strategy requires utilizing detection mechanisms in and around the system of interest, where those detection mechanisms may be used to identify the assertion of specific triggering events, e.g., triggers assert, or to identify the activation of specific trojans within the system. A purely defensive strategy may suffer from what may be termed an "iceberg problem", e.g., even though one or more triggers or trojans is affirmatively detected within the system, the exact number of triggers and/or trojans in the system remains unknown. One strategy of a malign, nefarious actor, e.g. a "black hat", may be to provide triggers and trojans within the system that are more easily found, thus masking more sophisticated well-hidden trojans within the system.

The third strategy that assumes infection of all electronics also suffers from the inherent detection issue of a defensive strategy. However, the goal with this strategy is to give more analytical weight to post trigger and attack recovery, rather than the prevention or simple detection of the attack. Post attack recovery inherently requires understanding the impact of the attack on the electronic system such that the consequences of the attack may be managed. And, in order to implement a recovery mechanism in the system that will be effective post deployment, the nature of the recovery must be analyzed and understood prior to when the electronic system is deployed. Said another way, this strategy is an integral part of the overall design of the electronic system.

In order to apply the defend strategy or the assume infection (recovery) strategy, the different points where an unauthorized user may attack the electronic system or extract data from the electronic system, e.g., attack surface, should be understood. Ideally, the attack surface should be understood during the design process, or at the very least, before the system is deployed. At present, no one single method can ideally identify when or where an attack will occur, nor can a single method ideally identify where in the electronics the attack is located. Therefore, different analysis methods are used to predict different types of attacks. A goal is to identify the most-likely, highest probability attacks and evaluate the effect of those attacks through simulation or emulation or during operation of test silicon (e.g., test chips) prior to releasing publicly available final distributed and deployed devices.

An inventor of the subject matter disclosed herein, Alfred L. Crouch, also has developed other certain improvements for use in cybersecurity systems, which improvements are fully described in the following pending applications or issued patents, all of which are expressly incorporated herein in their entirety:

"Method, System and Apparatus for Security Assurance, Protection, Monitoring and Analysis of Integrated Circuits and Electronic Systems in Relation to Hardware Trojans", U.S. Non-provisional application Ser. No. 16/145,891, filed 28 Sep. 2018;

"Method, System and Apparatus for Security Assurance, Protection, Monitoring and Analysis of Integrated Circuits and Electronic Systems in Relation to Hardware Trojans", U.S. Non-provisional application Ser. No. 16/450,336, filed 24 Jun. 2019;

"Method and System for Selection of Location for Placement of Trojans, Triggers and Instruments Within Integrated Circuits and Electronic Systems Using Contributory Operation Analysis", U.S. Non-provisional application Ser. No. 16/732,236, filed 31 Dec. 2019;

"Method and System for Selection of Location for Placement of Trojans, Triggers and Instruments Within Integrated Circuits and Electronic Systems Using Weighted Controllability and Observability Analysis", U.S. Non-provisional application Ser. No. 16/775,658, filed 29 Jan. 2020, now U.S. Pat. No. 10,909,284, issued 2 Feb. 2021;

"Method, System and Apparatus for Security Assurance, Protection, Monitoring and Analysis of Integrated Circuits and Electronic Systems Using Machine Learning Instruments and Machine Learning Analysis", U.S. Non-provisional application Ser. No. 17/134,438, filed 27 Dec. 2020; and "Method, System and Apparatus for Verification of Operation Using GPS Receiver Input Within Integrated Circuits and Electronic Systems Using an Operation Navigation System", U.S. Non-provisional application Ser. No. 17/134,441, filed 27 Dec. 2020.

Trojan effects can be launched from any gate connection or route in an IC design. It is theorized that nefarious actors likely will choose locations within the electronic facility for trojan insertion and trigger conditions that are difficult to find, making it less likely for the trojan to be discovered before its planned use (hence, maintaining the attacks value as a Zero-Day Exploit). It is also highly unlikely that a trojan attack is the result of a simple analysis during manufacturing where the nefarious individual picks a single transistor, gate or route to modify—this may not result in the desired targeted attack, with the exception of a few easy attacks such as placing a triggered gating element across the widely distributed clock or reset lines. An easy attack implemented at manufacturing can actually be easily discovered if an effort is made during silicon verification. It is more likely that the nefarious actor wishes to implement a more complex and stealthy attack and has information on the design, the behaviors, the functions and the application of the device they intend to infect with a trojan. An attack may then be targeted to achieve the required attack goal. By way of example, an attack may be targeted to prevent the device from conducting its normal operations or to prevent the device from operating altogether, i.e., a kill switch, or to allow a device to be taken over and controlled, i.e., $3^{rd}$ party operation, ransomware, or to leak critical information or structure, i.e., to enable reverse engineering or to expose secret data, codes or keys.

For a provider of electronics to defend against attacks or to provide countermeasures, anticipation of most-likely attacks is desirable. Relying on forensic analysis (i.e., evaluation of discovered and found Trojans, either pre-activation or post-activation) is insufficient in that many real world trojans are not disclosed publicly and so the forensics facts of those trojans are not known to most electronics providers during the design or manufacturing stages. At present, anticipation of trojan attacks has proven to be resistant to any single form of analysis and requires evaluation of the design to be manufactured to be examined multiple different ways to predict the different types of trojan attacks and their impact on the deployed electronics. To defend against attacks or provide countermeasures, it is advantageous to possess efficient, cost-effective methods and systems to identify, monitor, study, characterize, model, and counter hardware trojans and anomalous operation of facilities infected with hardware trojans. It is also advantageous to possess efficient, cost-effective methods and systems to plan and design facilities in relation to hardware trojans and potential anomalous operation associated with hardware trojans. It is advantageous to possess methods and systems to insert embedded instruments in a facility to detect, monitor and characterize hardware trojans and effects of such trojans. It is advantageous to possess methods and systems to insert embedded instruments in a facility to secure against and counter trojans and the effects of trojans.

For reasons stated above and for other reasons which will become apparent to those skilled in the art upon reading and understanding the present specification, there is a need in the art for improved methods, systems, and apparatus for security assurance, protection, monitoring and analysis of facilities and electronic systems including circuits, such as integrated circuits, in relation to hardware trojans, as well as the design, manufacture and use of same.

BRIEF DESCRIPTION OF THE INVENTION

The above-mentioned shortcomings, disadvantages and problems are addressed herein, as will be understood by those skilled in the art upon reading and studying the following specification. This summary is provided to introduce a selection of concepts in simplified form that are further described below in more detail in the Detailed Description. This summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In accordance with an embodiment a computer implemented method is provided for securing a facility in relation to a trojan. A facility model is first provided. The facility model may include a hardware model in a hardware description language (HDL), structural and functional description, RTL model, netlist model, or netlist. The facility model may be a Golden Model (meaning a reference model used as the standard vehicle to compare any changes or modifications against). The facility may be a Pristine Model (meaning a model presumed to be free of nefarious content). The trojan site location may be located by a trojan location analysis output provided by first performing a trojan vulnerability analysis. A trojan may be inserted at the trojan site location. A selected instrument may be first determined in relation to an effect of the trojan. The selected instrument may be second located by second performing an instrument location analysis in relation to the trojan location analysis output. The selected instrument may be inserted at an instrument site location in the facility model by pre-insertion marking of multi-stage hardware, matching corresponding control-side markers and operative-side markers of the selected instrument with the facility model and access architecture, and connecting the instrument to the facility model at corresponding markers. The selected instrument may be inserted at an instrument site location in the facility model by matching instrument control-side markers with facility control-side markers, and by matching instrument operative-side markers with facility operative-side markers. The selected instrument may be inserted at an instrument site location in the facility model by marking access architecture control-side markers at control-architecture points in relation to the facility model, and by matching the access architecture control-side markers to instrument control-side markers. The selected instrument also may be connected to the facility model by matching facility operative-side markers to the instrument operative-side markers. Operation of the infected, instrumented facility may be emulated on an emulation platform. The emulated infected facility may include the facility model, the selected instrument inserted and connected to the facility model, and the trojan inserted in the facility model, to provide emulation output of the infected, instrumented facility model. The selected instrument may be evaluated for efficiency and cost effectiveness in relation to the emulation output.

In an embodiment, a system for securing a facility in relation to a trojan may be configured to perform a method as disclosed herein. In an embodiment, a non-transitory computer-accessible medium may have stored thereon computer-executable instructions for securing an electronic facility in relation to a trojan, wherein, when a computer hardware arrangement executes the instructions, the computer hardware arrangement is configured to perform procedures of a method as disclosed herein.

BRIEF DESCRIPTION OF THE DRAWINGS

The disclosed subject matter itself, as well as further objectives, and advantages thereof, will best be illustrated by reference to the following detailed description of embodiments of the device read in conjunction with the accompanying drawings, wherein:

FIG. 8B is a second simplified graphical representation illustrating a maximal instrument trojan detection architecture in relation to detection metrics in an embodiment;

FIG. 9B is a second simplified graphical representation illustrating a maximal instrument trojan detection architecture in relation to cost metrics in an embodiment;

Figure 1:
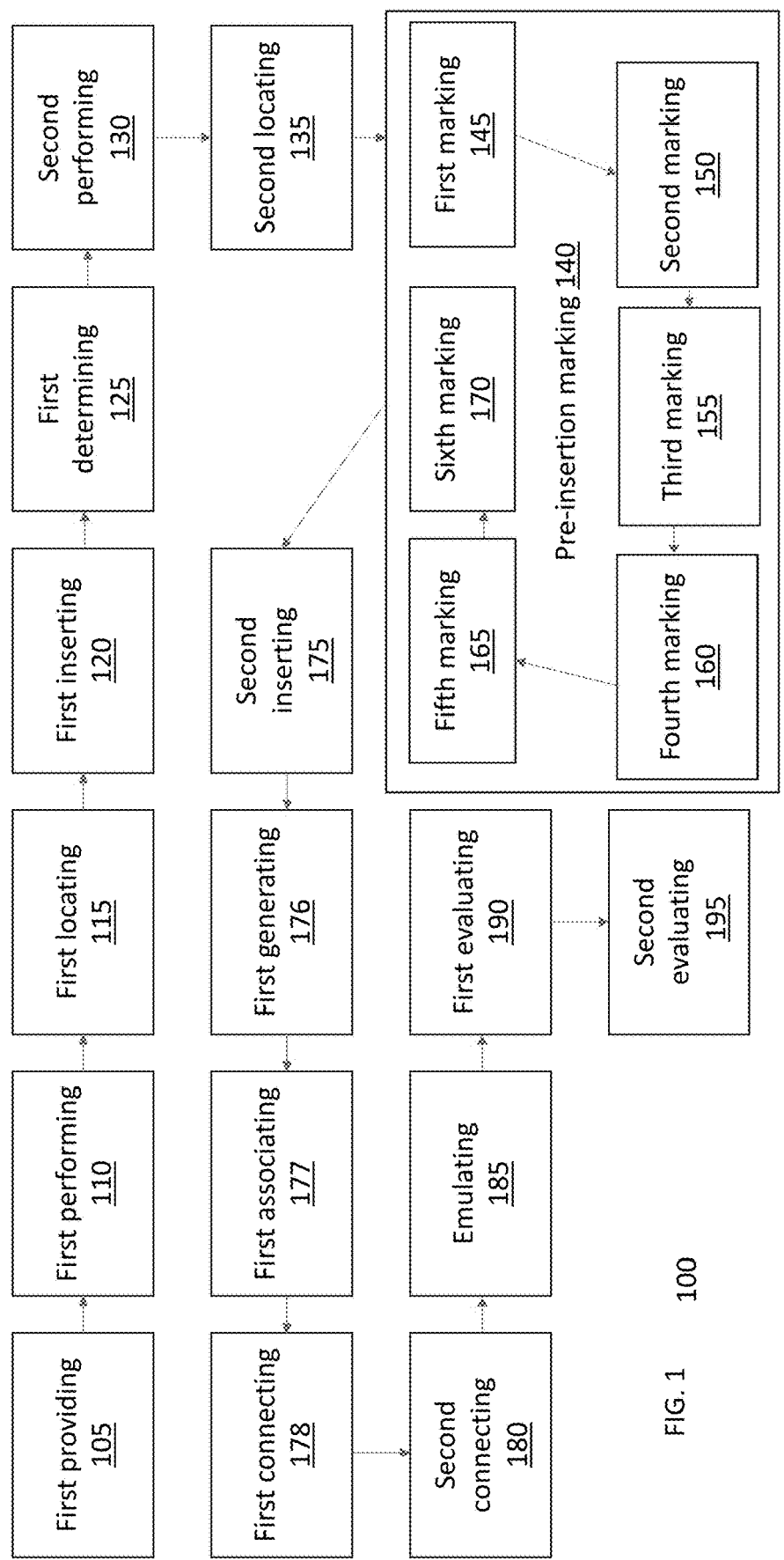
FIG. 1 is a simplified flow diagram of a computer-implemented method for securing an electronic facility in relation to a trojan, in an embodiment.

In the drawings, similar elements will be similarly numbered whenever possible. However, this practice is simply for convenience of reference and to avoid unnecessary proliferation of numbers and is not intended to imply or suggest that our invention requires identity in either function or structure in the several embodiments.

DETAILED DESCRIPTION OF THE INVENTION

In this detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein. The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

A cybersecurity breach, e.g., a trojan infection of an electronic facility, may be viewed as a "single fault assumption". The analytical techniques applicable to fault accounting and analysis may be applied to evaluate and predict the locations, modes and impacts of a trojan attack. These analytical techniques may be more efficient in time and resources than considering every gate as a possible location for multiple possible trojans. It may be advantageous to identify fundamental trojans by fault collapsing, as a reduced set of all possible trojans. This view of trojan insertion and detection may enable multiple design methods to be considered in relation to the placement of trojans and placement of instruments to detect such trojans, anomalous circuit conditions and activity from trojan attacks.

FIG. 1 is a simplified flow diagram of a computer-implemented method 100 for securing an electronic facility in relation to a trojan, in an embodiment. Method 100 may include first providing 105 a facility model. The facility model, for example, may be a hardware model in a hardware description language (HDL) such as VHDL, Verilog or System C, facility structural and functional description, RTL model, netlist model or netlist (the aforementioned, collectively, being "facility model"). Such a facility hardware model may be written, for example, in a register-transfer language ("RTL") such as Verilog or VHDL. In an embodiment, a Golden Model may comprise the facility model. In an embodiment, a Golden Model may comprise the facility model synthesized into a simple gate-level model and analysis disclosed herein may be applied to the gates.

Method 100 may include first performing 110 a trojan vulnerability analysis in relation to the trojan in relation to the facility model, to provide a trojan location analysis output. Performing 110 a trojan vulnerability analysis may be applied to the facility model to identify facility areas of high and low vulnerability. In an embodiment, identifying areas of high and low vulnerability may include determining controllability and observability. First performing 110 a trojan vulnerability analysis may be applied and performed in relation to a Golden Model, which, for example, may be a Verilog Golden Model comprising structured RTL, and may identify "lines of code" in such a Verilog Golden Model that represent vulnerability to trojans due to controllability and observability.

In an embodiment, method 100 may include first locating 115 a trojan site location in relation to the facility model in relation to the trojan location analysis output. Based upon the trojan location analysis output, a trojan site location may be selected, and the facility model, such as a behavioral model or netlist, may be modified by inserting the selected trojan at the trojan site location in the facility model.

In an embodiment, method 100 may include first inserting 120 a trojan, such as a known trojan, in the facility model in relation to the trojan location analysis output, such as at the trojan site location provided in first locating 115. Effects of the inserted trojan at the trojan site location may be monitored or studied by a selected instrument inserted in the facility model, by emulation on an emulation platform, as disclosed herein. In an embodiment, the lines of code in an RTL model can be markered by the placement of a buffer with a specific naming convention to identify where in the code different types of trojans may be inserted. The step of first inserting 120 the trojan may be used to substitute a trojan gate, e.g., AND-gate, OR-gate, Mux, etc., for the marker. Based upon the trojan location analysis output, a trojan site location may be selected, and the facility model, which may be a Golden Model, may be modified by inserting the selected trojan at the trojan site location in the facility model. Insertion of the trojan at the trojan site location in the facility model can be considered as providing a trojan infected facility model (or "infected Golden Model") representing a trojan infected facility. It will be understood that a detection instrument may be sited in relation to a trojan site location in relation to a known trojan inserted, in fact, at the trojan site location; in relation to a probabilistic model of a possible trojan at the trojan site location; or both.

Method 100 may include first determining 125 a selected instrument in relation to an effect produced by the trojan. The selected instrument may be determined, for example, from a trojan detection instrument database. The selected instrument may reflect that a particular instrument type may be advantageous for monitoring effects of multiple trojans. The selected instrument may comprise selected instrument information. The selected instrument information may include control-side instrument information including control-side connections. The selected instrument information may include operative-side instrument information including operative-side connections. In an embodiment, the selected instrument may be a machine learning instrument.

Method 100 may include second performing 130 an instrument location analysis in relation to the facility model in relation to the trojan location analysis output, to provide an instrument location analysis output. The instrument location analysis output may reflect that a location may be advantageous for monitoring effects of multiple trojans or multiple trojan site locations. The instrument location analysis output may reflect that a location may be advantageous for monitoring effects of multiple trojans or multiple trojan site locations, to produce different types and amounts of information about multiple trojans.

Method 100 may include second locating 135 an instrument site location in relation to the facility model in relation to the instrument location analysis output, to provide an instrument site location output. Second locating 135 may include selecting an instrument site location in relation to the effect of the trojan and observability. The instrument site location output also may be impacted by the instrument type of the selected instrument in relation to the trojan. The instrument site location output analysis may reflect that an instrument site location may be advantageous for monitoring effects of multiple trojans or multiple trojan site locations. The instrument site location analysis output may reflect that an instrument site location may be advantageous for monitoring effects of multiple trojans or multiple trojan site locations, to produce different types and amounts of information about multiple trojans. The facility model may be evaluated to determine potential trojan sites in a probabilistic analysis or probabilistic model, and instrument site locations may be located where selected instruments may be placed to cover or monitor the effect of the trojan or effects of multiple trojans.

Method 100 may include pre-insertion marking 140 of multi-stage hardware in relation to the selected instrument, facility model, and access architecture, to provide multi-stage hardware markings. Method 100 may include first marking 145 of instrument control-side markers on control-side connections of the selected instrument. Method 100 may include second marking 150 of instrument operative-side markers on operative-side connections of the selected instrument.

Method 100 may include third marking 155 of facility control-side markers on control-side connections of the facility model. Method 100 may include fourth marking 160 of facility operative-side markers at monitor points of the facility model.

Method 100 may include fifth marking 165 of access architecture control-side markers at control-architecture points. Method 100 may include sixth marking 170 of access architecture operative-side markers on operative-architecture points.

Method 100 may include second inserting 175 of the selected instrument in the facility model at the instrument site location in relation to the multi-stage hardware markings.

Method 100 may include first generating 176, by a first tool process, access architecture to be associated with the selected instrument. Method 100 may include first associating 177, by the first tool process, the access architecture with the selected instrument. Method 100 may include first connecting 178, by the first tool process, the selected instrument to the access architecture by matching the access architecture control-side markers to instrument control-side markers.

Method 100 may include second connecting 180, by a second tool process, the selected instrument to the facility model by matching facility operative-side markers to the instrument operative-side markers.

Method 100 may include emulating 185 the infected facility on an emulation platform. The emulated infected facility may include the facility model, the selected instrument inserted and connected to the facility model, and the trojan inserted in the facility model. Emulation can provide emulation output of the infected, instrumented facility model.

Method 100 may include first evaluating 190 efficiency of the selected instrument for detecting the trojan, in relation to the emulation output. Method 100 may include second evaluating 195 cost effectiveness of the selected instrument in relation to efficiency of the selected instrument for detecting the trojan, in relation to the emulation output.

Figure 2:
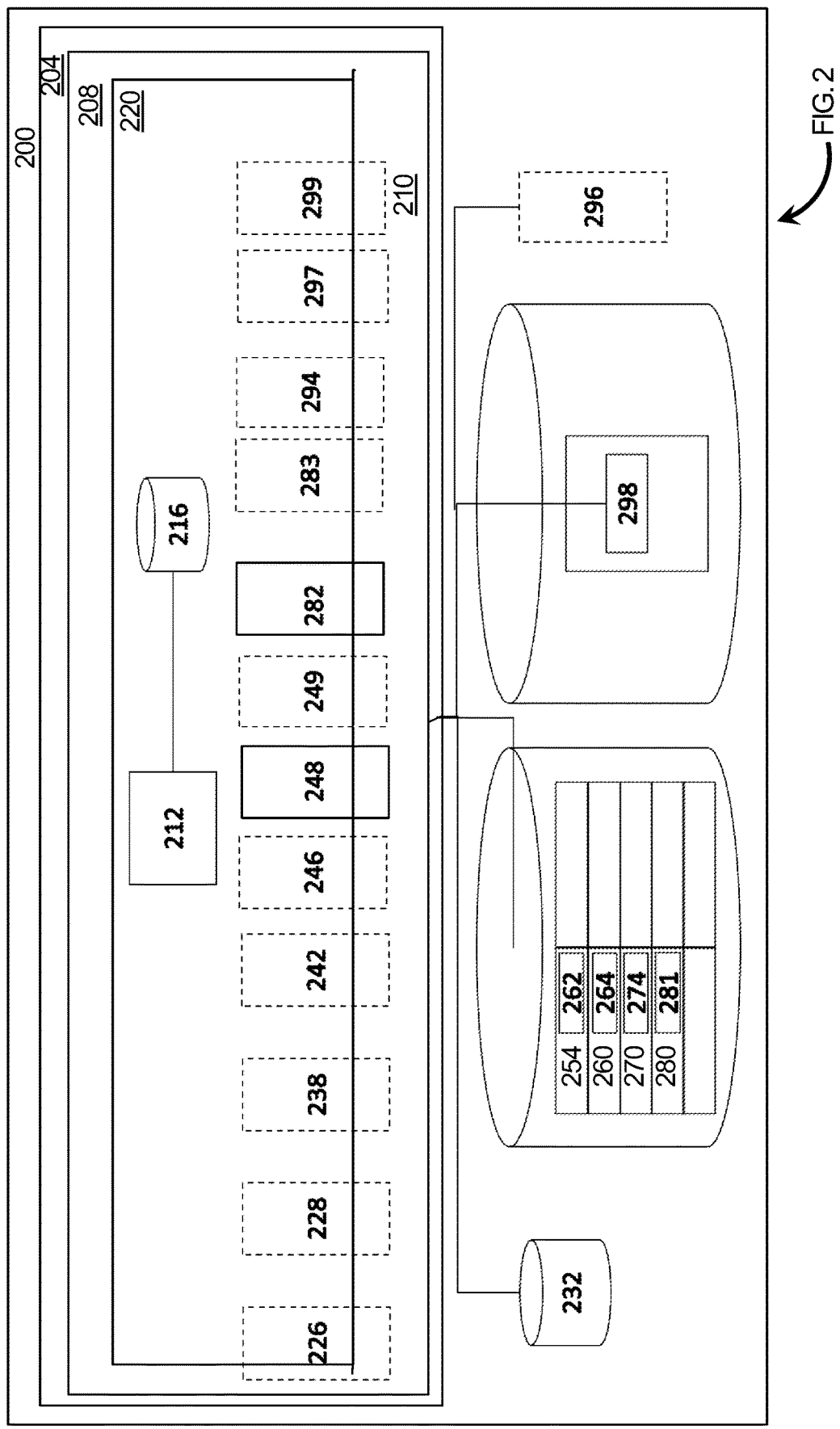
FIG. 2 is a simplified block diagram showing a system for securing an electronic facility in relation to a trojan, in an embodiment.

FIG. 2 is a simplified block diagram of a system 200 for securing an electronic facility ("facility") in relation to a hardware trojan, in an embodiment. It will be understood that system 200 may be configured to perform a method for securing a facility in relation to a hardware trojan, such as method 100 or other similar method. Referring to FIG. 2, system 200 may include an emulation host system 204. Emulation host system 204 may include a programmable hardware component 208 and programmable software component 210. Programmable hardware component 210 may include one or more processors 212 operably coupled to memory 216. In embodiments, programmable hardware component 208 may include a field programmable gate array (FPGA) 220. An FPGA of the Virtex® family made by Xilinx Inc., San Jose, California, is suitable. A suitable emulation host system 204, for example, may be a Vivado® Simulator system available from Xilinx Inc., San Jose, California. A suitable emulation host system 204 may support mixed-language simulation and may include a hardware description compiler 226. Hardware description compiler 226 may include, for example, a compiler for an IEEE standard hardware description language (HDL) such as Verilog, SystemVerilog™, VHDL, or other hardware description language. In embodiments, emulation host system 204 may include one or more design conversion modules 228 configured to convert the high-level description to a logic-level register transfer level (RTL) description, a gate-level (GL) description, a layout-level description, or a mask-level description. A golden circuit model file 232 of the facility (not shown) may be generated from a design library or other automated design technique. The golden circuit model file 232 may be synthesized from a design specification in a hardware description language (HDL), files or group of files, register transfer level (RTL) description, a gate-level (GL) description, a layout-level description, or a mask-level description, or from a netlist.

In embodiments, emulation host system 204 may include one or more processors 212 coupled to memory 216 to process instructions accessed in the memory 216. The one or more processors 212 may be configured to receive the golden circuit model file 232 for emulation. In some embodiments, the high-level design may be embodied in an IEEE standard hardware description language (HDL), Verilog, System Verilog™, VHDL, logic-level description, register transfer level (RTL) description, a gate-level (GL) description, a layout-level description, or a mask-level description. The golden circuit model file 232 design description may be compiled in a suitable hardware description language compiler. Processor 212 may provide a facility structural and functional description, RTL model or netlist model to such a compiler.

Emulation host system 204 may include a clocked control and data flow graph (CCDFG) module 238 configured to provide control graphs for emulating operation of the golden circuit model. It will be understood that the CCDFG module 238 may identify or represent state-change or input-change bits. Emulation host system 204 may include an evaluating module 242 for producing emulation results from the CCDFG module.

System 200 may include a hardware trojan management module 246 configured to access a hardware trojan model file library 254 and coordinate accessing of a first hardware trojan model file 262 for insertion in a golden circuit model file 232 to provide a trojan-infected golden circuit model file. Hardware trojan management module 246 may be configured to perform a trojan vulnerability analysis, of the facility model, for a hardware trojan model file in relation to the facility structural and functional description, RTL model or netlist model to provide a trojan location analysis output.

System 200 for securing a facility in relation to a hardware trojan, may include hardware trojan model file library 254 accessible by the hardware trojan management module 246. Hardware trojan model file library 254 may include a plurality of hardware trojan model files ("hardware trojan models"). The hardware trojan model file library 254, plurality of hardware trojan model files, or both, may include, or may be associated with a plurality of trigger model files. Hardware trojan model file library 254 may include a first hardware trojan model file 262. The first hardware trojan model file 262 may include, or may be associated with, a first trigger model file. The first hardware trojan model file 262 is an insertable hardware element that may be inserted into golden circuit model file 232. In embodiments, the first hardware trojan model file 262 may include all, or any, of the following: a first trojan payload model, a first trojan trigger model, a first trojan installation model, a first trojan content model, a first trojan operation model, and a first trojan behavior profile model. In some embodiments, a first trojan identification profile or signature profile may include all, or any, of the following: a first trojan payload model, a first trojan trigger model, a first trojan installation model, a first trojan content model, a first trojan operation model, a first trojan behavior profile model. In a different embodiment the trojan triggers may also be represented as elements within a library 260 with associated first trigger model file 264.

System 200 may include an instrument management module 248 configured to access an instrument model file library 270 and coordinate accessing of a first instrument model file 274 for insertion in a golden circuit model file 232 to provide an instrumented golden circuit model file. Instrument management module 248 may be configured to perform first determining of a selected instrument in relation to an effect produced by the trojan. The selected instrument model file may include selected instrument information. The selected instrument information may include control-side instrument information, including control-side connections. The selected instrument information may include operative-side instrument information, including operative-side connections. Instrument management module 248 may be configured to perform first defining of instrument control-side markers on the control-side connections of the selected instrument. Instrument management module 248 may be configured to perform second defining of instrument operative-side markers on the operative-side connections of the selected instrument.

System 200 for securing a facility in relation to a hardware trojan, may include instrument model file library 270 accessible by the instrument management module 248. Instrument model file library 270 may include a plurality of instrument model files ("instrument models"). Instrument model file library 270 may include a first instrument model file 274. The first instrument model file 274 may be inserted into golden circuit model file 232.

System 200 may include a countermeasure management module 249 configured to access a countermeasure model file library 280 and coordinate accessing of a first countermeasure model file 281 for insertion in a golden circuit model file 232 to provide a countermeasure golden circuit model file.

System 200 for securing a facility in relation to a hardware trojan, may include countermeasure model file library 280 accessible by countermeasure management module 249. Countermeasure model file library 280 may include a plurality of countermeasure model files ("countermeasure models"). Countermeasure model file library 280 may include the first countermeasure model file 281. The countermeasure model file 280 may be inserted into golden circuit model 232 to provide a countermeasure golden circuit model file.

System 200 for securing a facility in relation to a hardware trojan, may include an emulation data analysis module 297. Emulation data analysis module 297 may resolve analysis of the golden circuit model file 232.

System 200 for securing a facility in relation to a hardware trojan, may include an insertion process resolution module 282. Insertion process resolution module 282 may manage insertion of insertable hardware elements into the golden circuit model file 232 to provide a modified golden circuit model file. Insertion process resolution module 282 may resolve insertion of the first hardware trojan model file 262, first instrument model file 274, and first countermeasure model file 281 in relation to the golden circuit model file 232 to provide a modified golden circuit model file. In an embodiment, the modified golden circuit model file may be a trojan-infected instrumented golden circuit model file, which may be modified by inserting first trojan model file 262 and first instrument model file 274 in golden circuit model file 232. In an embodiment, the modified golden circuit model file may be a trojan-infected instrumented countermeasure golden circuit model file, which may be modified by inserting first trojan model file 262, first instrument model file 274 and first countermeasure model file 281 in golden circuit model file 232. Insertion process resolution module 282 also may resolve insertion of golden circuit model file 232, which may be the modified golden circuit model file, in relation to the emulation host system 204.

System 200 for securing a facility in relation to a hardware trojan, may include an insertion hardware marking module 283. In an embodiment the insertion process resolution module 282 may provide unmarked insertable hardware model files, the unmarked golden circuit model file, or both, to the insertion hardware marking module 283. The insertion hardware marking module 283 may perform: hardware marking of corresponding insertable hardware model files to provide marked insertable hardware model files, hardware marking of the unmarked golden circuit model file to provide a marked golden circuit model file, or both. The insertion hardware marking module 283 may provide associations between corresponding hardware markings of the marked insertable hardware model files and marked golden circuit model file. The insertion hardware marking module 283 thus may provide a marked version of the first hardware trojan model file, a marked version of insertion architecture, a marked version of the first instrument model file, and a marked version of a countermeasure model file in relation to the marked golden circuit model file. The hardware markings may include control-side markers, operative-side markers, or both.

System 200 for securing a facility in relation to a hardware trojan, may include an emulation data analysis module 297. Emulation data analysis module 297 may manage analysis of data collected by data collection module 296 from emulation operations of the golden circuit model file 232, which may be the modified golden circuit model file. Emulation data analysis module 297 may provide emulation data analysis output of the modified golden circuit model file.

System 200 may include an emulation data analysis output file library 298 of archived emulation data analysis output files collected for a history or portfolio of facility emulations for a facility or plurality of facilities. System 200 may include a predictive characterization module 299 including a machine learning sub-module 294. The predictive characterization module 299 may be configured to determine a correlation between a particular instance of emulation data analysis output and the emulation data analysis output file library 298 of archived emulation data analysis output files collected for the history or portfolio of facility emulations for a facility or plurality of facilities, to provide a hardware trojan predictive characterization. The hardware trojan predictive characterization, provided from predictive characterization module 299, may include any information of a hardware trojan model file, such as a hardware trojan effect; probabilistic trojan location characterization or prediction; any information of a corresponding instrument model file behavior and instrument output characterization or prediction; any information of a corresponding facility model file behavior and output characterization or prediction; and any information of a corresponding countermeasure model file behavior and countermeasure output characterization or prediction.

In an embodiment, system 200 may include a non-transitory computer-accessible medium having stored thereon computer-executable instructions for securing an electronic facility in relation to a trojan, wherein, when a computer hardware arrangement executes the instructions, the computer hardware arrangement is configured to perform procedures comprising the steps of a method for securing a facility in relation to a hardware trojan. Such method may be method 200 or other suitable method for securing a facility in relation to a hardware trojan.

In an embodiment, an electronic design software application may embody system 200 as disclosed herein, for securing a facility in relation to a hardware trojan. In an embodiment, a chip package may include an integrated circuit designed by operation of the electronic design software application that embodies system 200.

In some embodiments, the capability to insert a target instrument into the proper location within a device/design is a complex problem. A vulnerability analysis may determine where trojan attacks that rise to a certain level of concern should be placed (functional, logical or physical location). In a parallel analysis or in an analysis conducted after the trojan location determination, the instrument location may also be determined. The instrument location may be the best place to locate a targeted detection instrument (at least matched to the effect produced by the trojan) or a determination of "what feature" will be impacted by the trojan and so a "learning instrument" can be used to learn what "normal" represents (where the trojan attack will introduce "abnormal" or "anomalous" operation into the field of the "learning instrument"). The instrument can then be "evaluated" for efficiency by the insertion of trojan attacks and the instrument can be made better (more efficient in detection, more efficient in learning, more comprehensive, more effective in cost, smaller, etc.).

A full-featured EDA tool, such as a Verilog Model Parsing tool available from Synopsys or Mentor, may be operated to receive input and insert logical or circuit elements of an "instrument" as herein disclosed herein. Control input to such an EDA tool, for inserting such an instrument, may be provided from a Vulnerability Analysis and an Instrument Location Analysis, as disclosed herein. Insertion of the instrument into the circuit, by providing such control input to an EDA tool, may be performed in at least two steps relating to corresponding two portions of such an instrument. Instruments as disclosed herein may have two (2) portions, including: (1) a control portion that may configure, enable, operate, read from and write to the instrument; and (2) an operative portion that may monitor, modify, or both, a location within the Golden Model. Generally, one EDA tool is used to create the Control Portion (i.e., a JTAG creation and insertion tool) and another EDA tool is used to create or connect the Operative Portion (e.g., a scan insertion or BIST insertion type tool). Control input to drive the EDA insertion tool may relate to performing a Vulnerability Analysis and Instrument Analysis as disclosed. In an embodiment as disclosed, insertion of instruments in relation to a Golden Model is performed by reference to instrument markers (or "markers"). Such instrument markers may be of two types: (i) Control-Side markers, and (ii) Operational-Side markers. Such markers are associated with the logical/circuit description of the instrument. Control-Side markers are associated with the control-side of a JTAG or other access controller network or architecture. Operational-Side markers are associated with the operational-side of an instrument, which connects to a location in the Golden Model.

Figure 3:
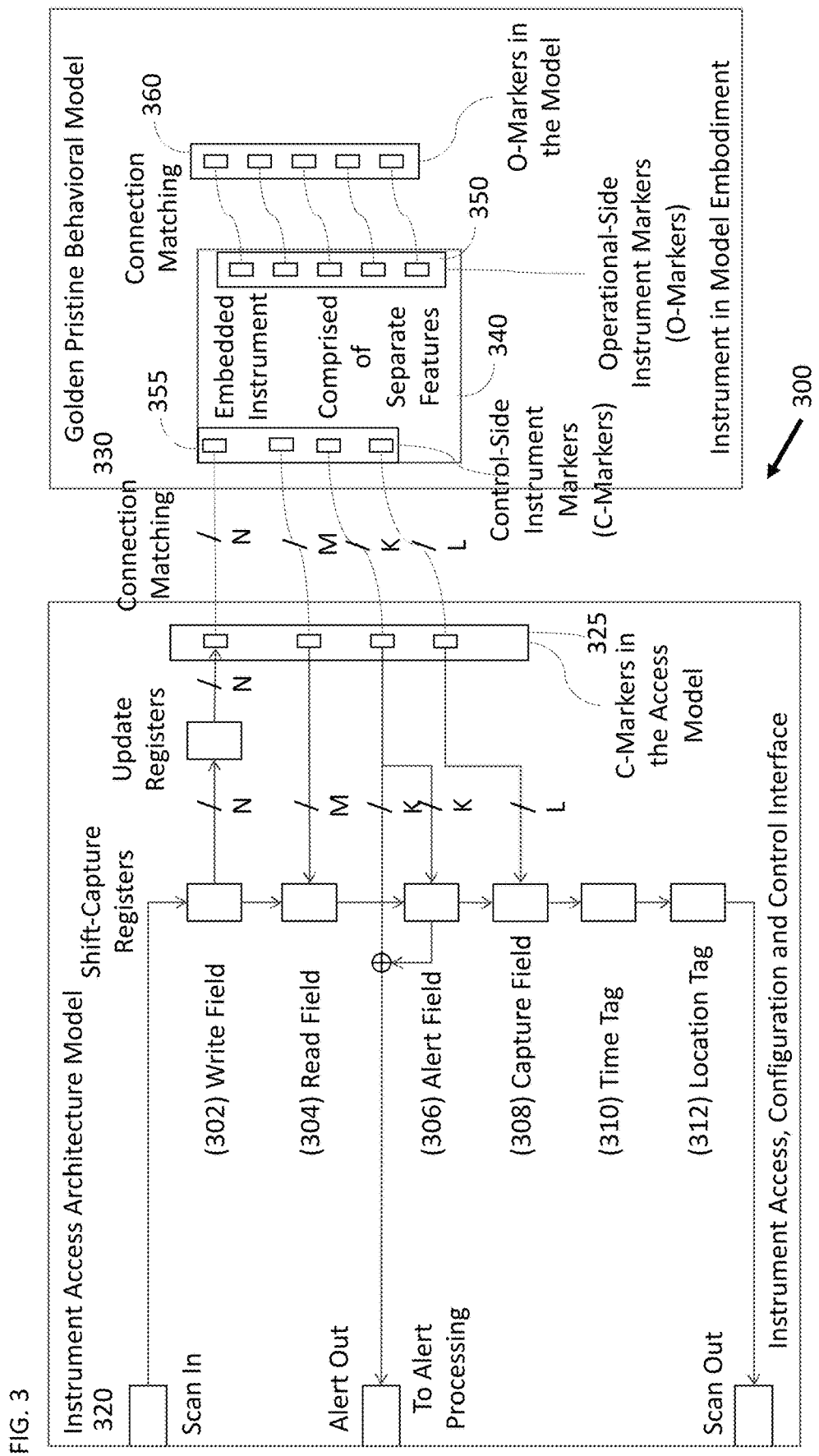
FIG. 3 is a simplified schematic diagram showing instrument connections to both control structures and operative structures in an embodiment.

FIG. 3 is a simplified schematic diagram showing instrument connections to both control structures and operational structures. Embedded instrument 340 is illustrated as being located within a Golden Pristine Behavioral Model 330. Illustrated are control-side instrument-connections 355 matched to control-side access-mechanism-connections 325 in the instrument access architecture model 320 and operational-side instrument-connections matched to operational-side model-connections 360. In one embodiment, a single comprehensive EDA tool may be capable of generating, managing, implementing, and connecting all of the identified elements involved with instrument access, control and operation. In another embodiment, multiple different EDA tools may be required. In an embodiment where multiple different EDA tools are used, one tool may generate the instrument access network and manage the control-side connections, and a second tool may manage the instrument generation and insertion and manage the operational-side connections.

The aforementioned two-part structure (i.e. control portion and operational portion) of an instrument as herein disclosed is associated with instrument connection complexity. As further disclosed in FIG. 6 in relation to method 600, determining instrument connections of an instrument as disclosed may include applying 630 a Trojan Vulnerability Analysis and submitting to 645 an Instrument Analysis. In an embodiment, such a method for determining instrument connections may include applying 630 a Trojan Vulnerability Analysis by analyzing and then marking the Golden Model 640 for the location 635 and type of Trojan attacks. In an embodiment, such a method for determining instrument connections may include submitting to 645 an Instrument Analysis by then analyzing and marking the marked Golden Model provided from applying 630, for the "operative locations and types and sizes" of each of the instruments to be used for attack detection and recognition. Submitting to 645 such an Instrument Analysis may include analyzing whether proposed Trojans at the proposed locations identified in the Vulnerability Analysis can be detected, and further, whether the proposed Trojans thus detected can be identified. Referring to FIG. 3, after the operative locations, types and sizes are established, then the instrument access network 320 can be created (e.g., the generation of Verilog code) and added to the Golden Model. As shown in FIG. 3, the individual instrument portion of the access network 320 can be quite complex and may include various bit-fields that may be one or more bits in width. Some of the fields necessary for a cybersecurity machine learning instrument control and data collection set of operations are: a write field 302 to convey data into the instrument, a read field 304 to extract data or status from the instrument, an alert field 306 if the instrument generates an alarm or reports that anticipated settings, levels or operations have been matched or exceeded, a capture field 308 if the instrument generates a value such as a count or temperature that needs to be captured and reported, a time-tag 310 that represents when a sample event has occurred or when a capture has been accomplished, and a location-tag 312 that is an index number that relates the instrument's location to a coordinate in the physical layout map. This does not represent a complete set of instrument control-side interfaces, there may be, for example, even more complex fields such as a GPS location-tag in devices that contain a continuously operating functional GPS receiver where the GPS coordinates of the device can be captured to provide a geographical location or an altitude at the time of the sample operation of the instrument access network or the capture event of the operational value of the instrument. In an embodiment, a GPS receiver can be used as an instrument and would be controlled from an instrument access control network 320.

Figure 4A:
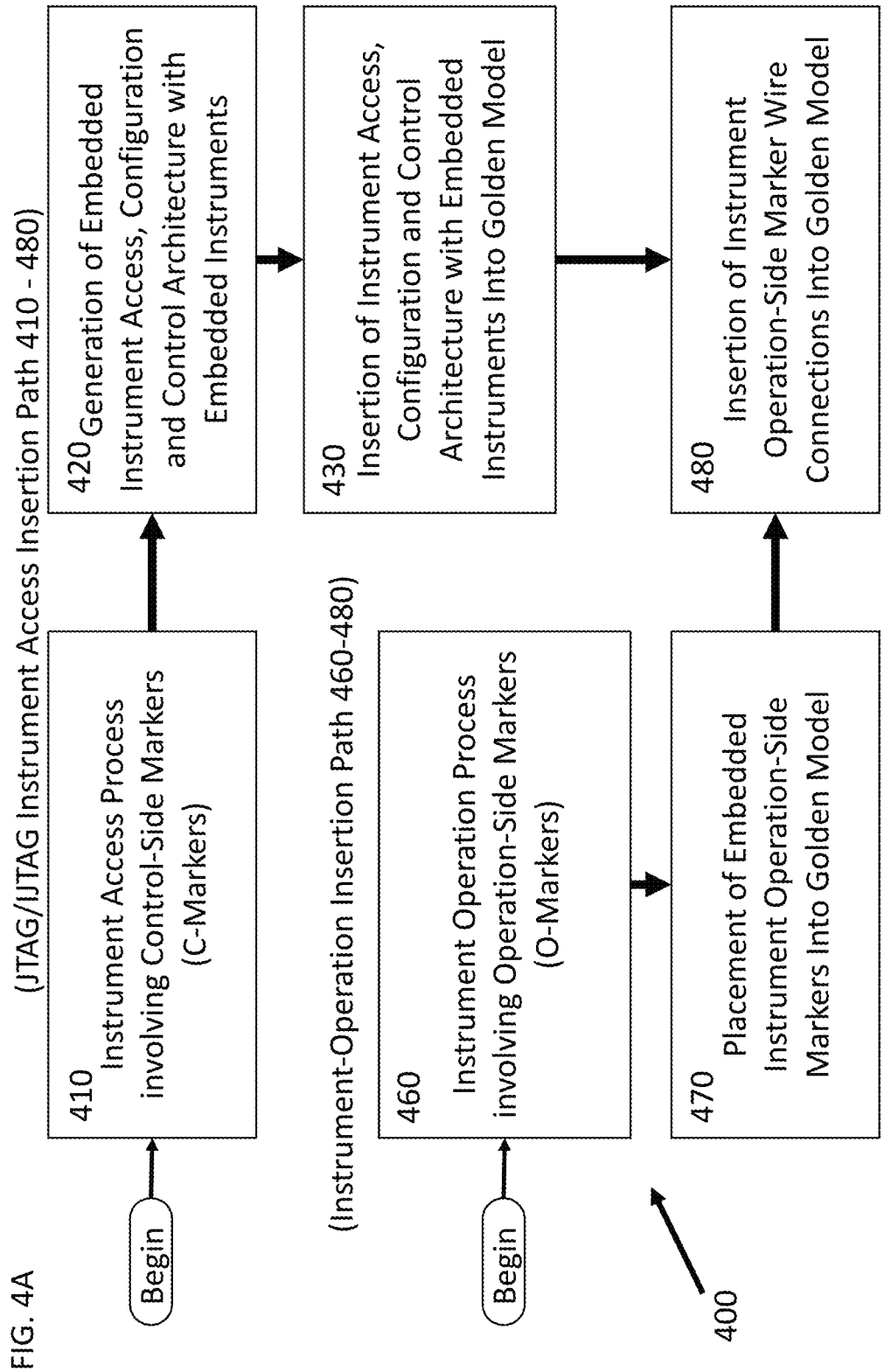
FIG. 4A is a simplified flow diagram of a method for inserting cybersecurity instruments into the instrument control structure in a model of an electronic facility.

FIG. 4A illustrates one embodiment in a block diagram flow chart of the method of placement of the Control-Side markers 410 and the Operational-Side markers 460 into the Golden Model. There are two distinct flows where one flow 400 generates and places an instrument access network 420 and instrument 430 into the Golden Model, thereby creating a Golden Instrumented Model; and the second flow 460 identifies the locations for the operational markers 470 and places the operational markers into the Golden Model. Ultimately, both paths come together when the operational connections are made from the operational markers in the instrument are matched and connected to the operational markers in the Golden model 480.

Figure 4B:
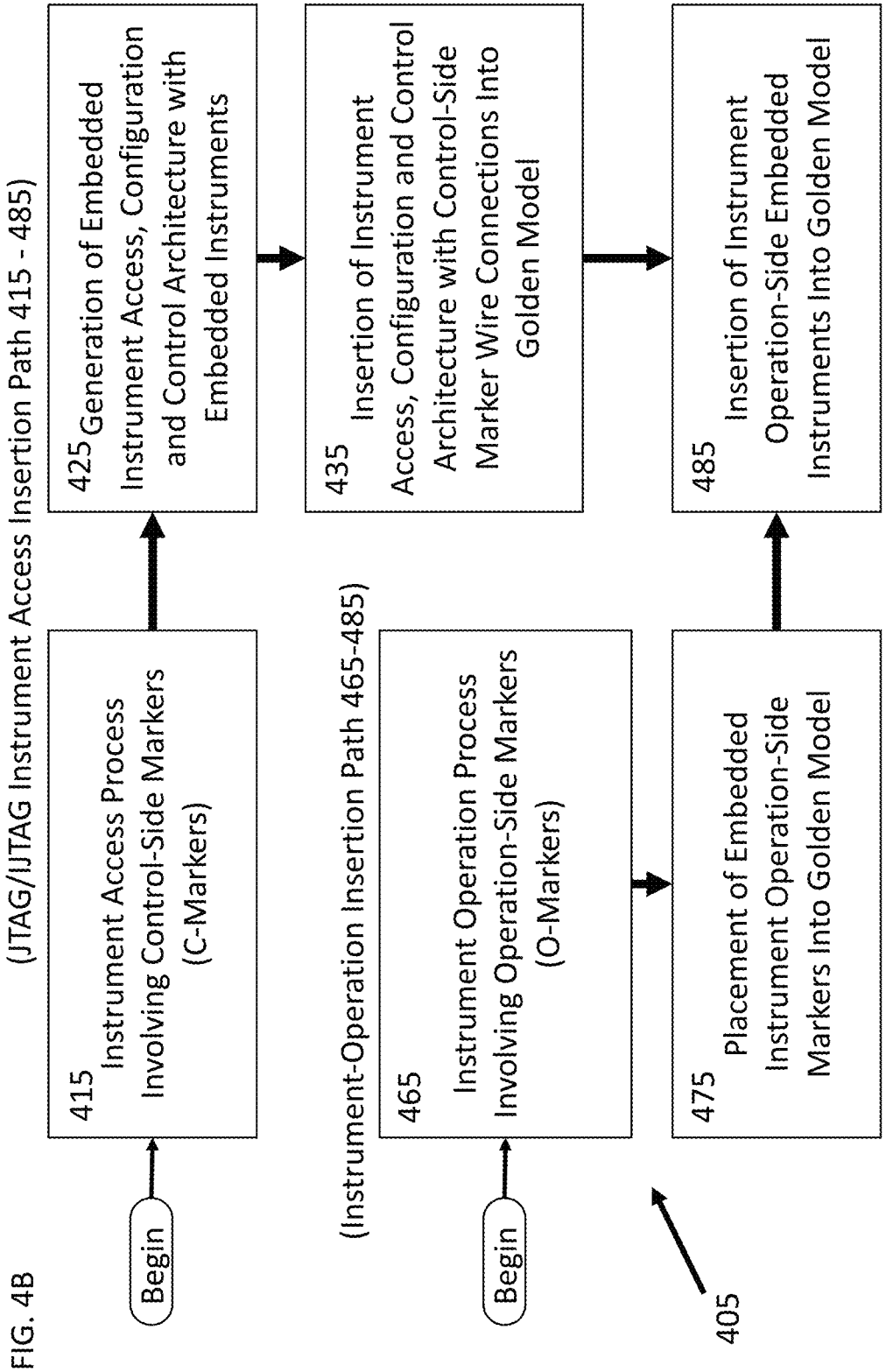
FIG. 4B is a simplified flow diagram of a method for inserting cybersecurity instruments into the operative model of an electronic facility.

FIG. 4B illustrates a different embodiment in a block diagram flow of the method of placement of the Control-Side markers 415 and the Operational-Side markers 465 into the Golden Model. However, a difference between FIG. 4A and FIG. 4B is that the instruments may be inserted into the Golden model as part of the O-Marker operational flow 405 in FIG. 4B whereas the instruments may be inserted as part of the C-Marker instrument access network flow 400 in FIG. 4A.

At this point, after the instrument access network has been designed, generated or purchased and populated with C-Markers, the instruments may be created or acquired and configured from a library of instruments (e.g., stored Verilog code elements or purchased IP code). In some cases, complex instruments may need to be assembled from multiple simple instrument elements stored in the library of instrument elements (or instrument features). The insertion process first generates and adds the instrument access architecture to the Golden Model, then each instrument is physically inserted into the model where the control-side is connected to the instrument access network and the operative-side is connected to the functional portion of the Golden Model. In one embodiment, the code that represents the instrument may be incorporated or co-located within the access mechanism [see reference 430 in FIG. 4A]. In another embodiment, the code that represents the instrument can be incorporated or co-located within the Golden Model [see reference 485 in FIG. 4B]. In another embodiment which is a hybrid scheme, some instruments may be included with the access mechanism and other instruments may be included within the Golden Model. Placement of such instruments may depend on the complexity and number of connections that must be routed through the model hierarchy, with the instruments being placed at locations where the minimum number of changes to the Golden Model) are needed. Referring to FIGS. 3, 4A and 4B, the actual connections of the instrument features to both the control-side and the operational-side are through the use of markers. A marker, for example, may be a passive Verilog construct such as a buffer (or multi-input and multi-output gang-buffer) that uses a naming convention that identifies the location and size of an instrument connection and the type of instrument feature to be connected. One marker (or marker group) is generated in association with the instrument access architecture (where to put the instrument in the control network) and the other marker (or marker group) is generated as an output of the instrument analysis process (where to connect the instrument's operational portion to an identified location in the functional model). A parser then reads the Golden Model and inserts the instrument feature code into the Golden Model RTL (register-transfer-level model) at the proper module location and generates all of the ports and signal declarations needed to route signals associated with the instrument up or down the module hierarchy.

Figure 5A:
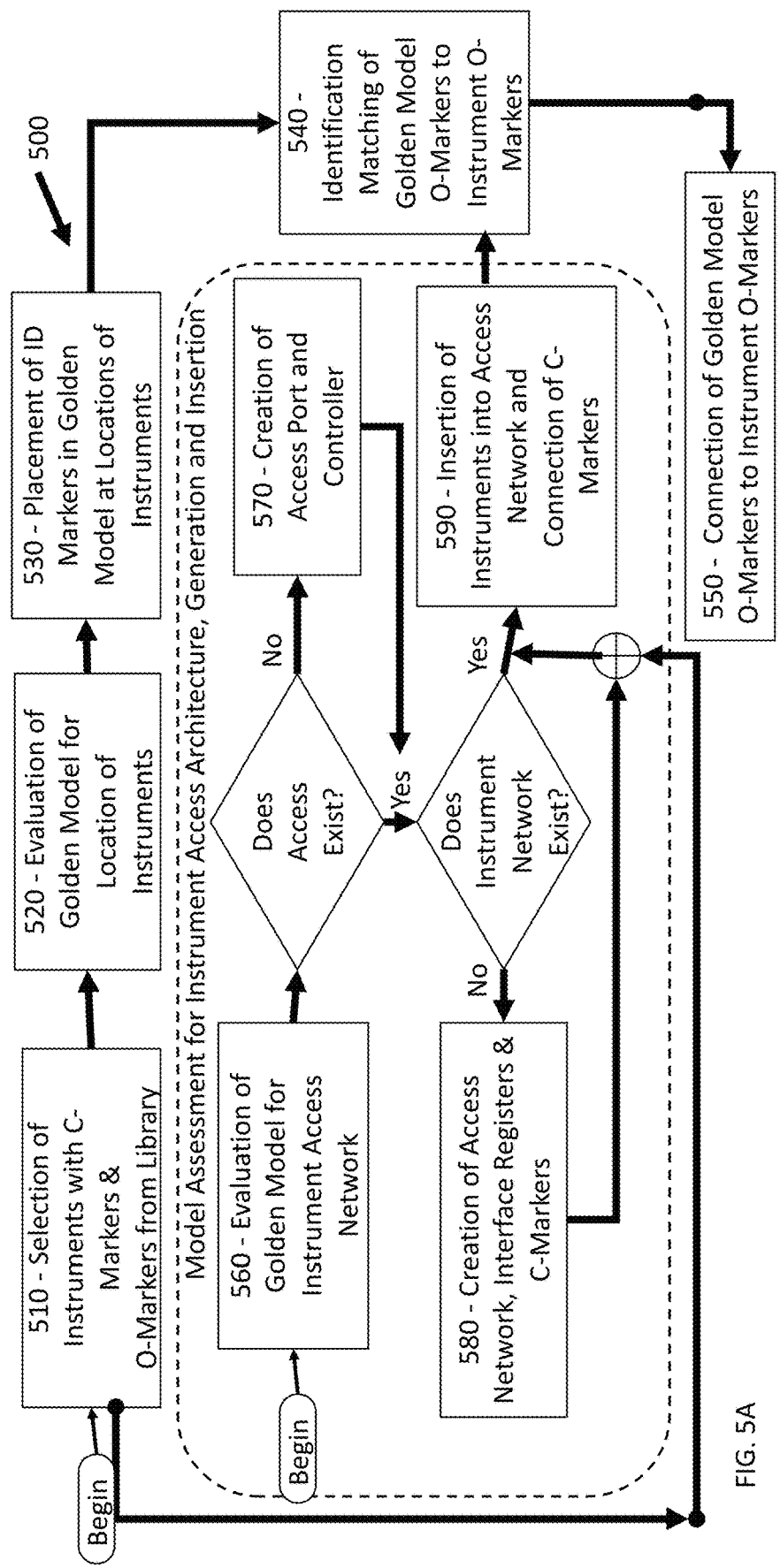
FIG. 5A is a simplified flow diagram showing further details of an automated method for generating an instrument control structure and inserting cybersecurity instruments into the control structure in a model of an electronic facility.
Figure 5B:
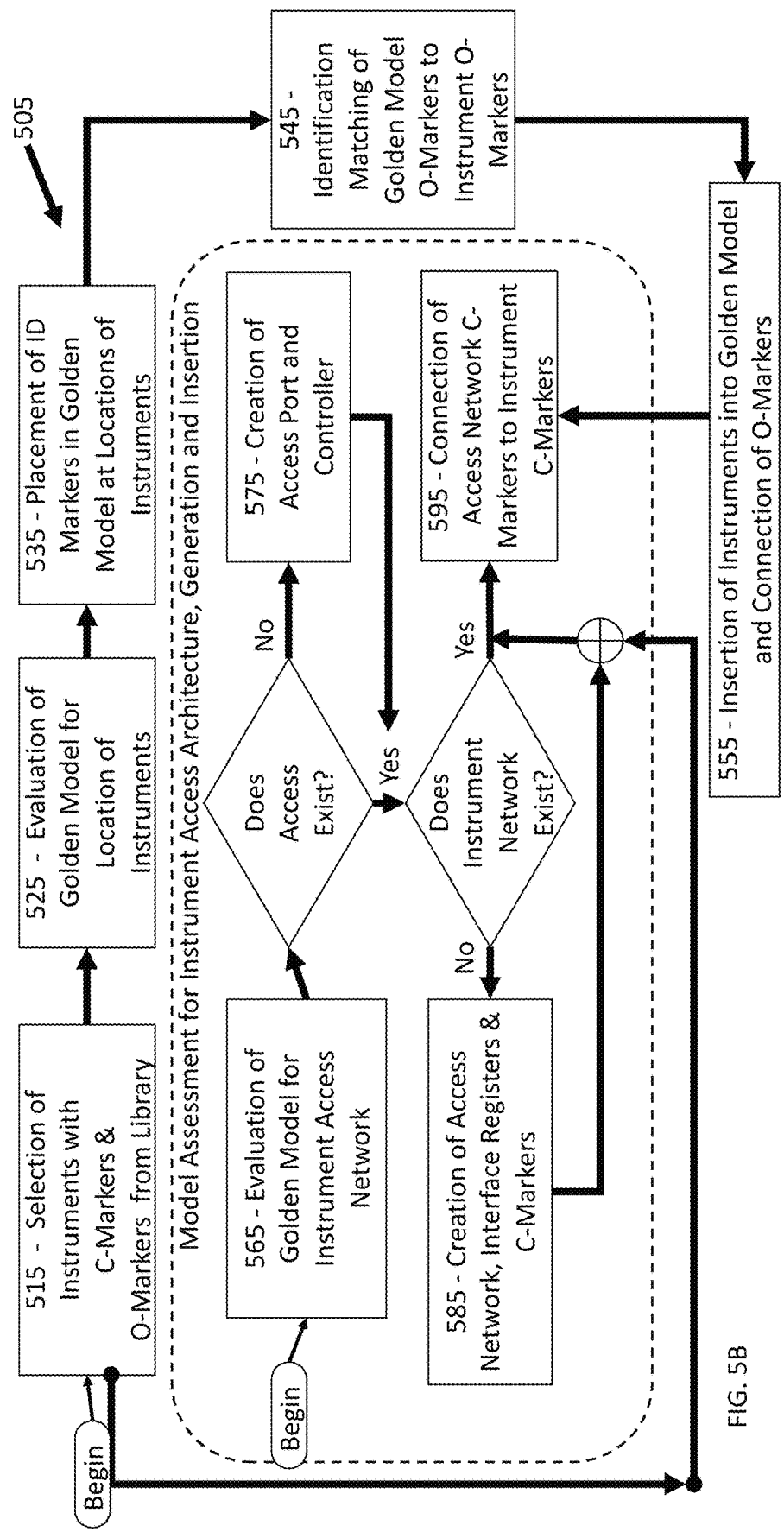
FIG. 5B is a simplified flow diagram showing further details of an automated method for generating an instrument control structure and inserting cybersecurity instruments into the operative model of an electronic facility.

One element of complexity to the addition of instruments to a Golden Model is whether the instrument access network is an already existing structure such as the IEEE Standard 1149.1, IEEE Standard 1500 or IEEE Standard 1687 embedded access structures. If the access structure exists, then it must be modified to enable the incorporation of instruments; if the access structure does not exist, then an access structure configured to enable incorporation of instruments must be generated to accommodate the required embedded instruments. FIG. 5A illustrates in a block diagram flow chart method 500 for assessment and connection for instrument access architecture and locations, including a two-path instrument insertion process that includes evaluating 560 a Golden Model for the existence of the instrument access mechanism and if so, evaluating whether the instrument access mechanism is sufficient to accommodate the necessary embedded instruments. FIG. 5A illustrates particularly an embodiment of insertion flow where the instruments are inserted as part of the C-Marker flow. FIG. 5B illustrates in a block diagram flow chart method 505 for assessment and connection for instrument access architecture and locations, including a two-path instrument insertion process that includes evaluating 565 a Golden Model for the existence of the instrument access mechanism and if so, evaluating whether the instrument access mechanism is sufficient to accommodate the necessary embedded instruments. FIG. 5B illustrates particularly an embodiment of insertion flow where the instruments are inserted as part of the O-Marker flow.

Figure 6:
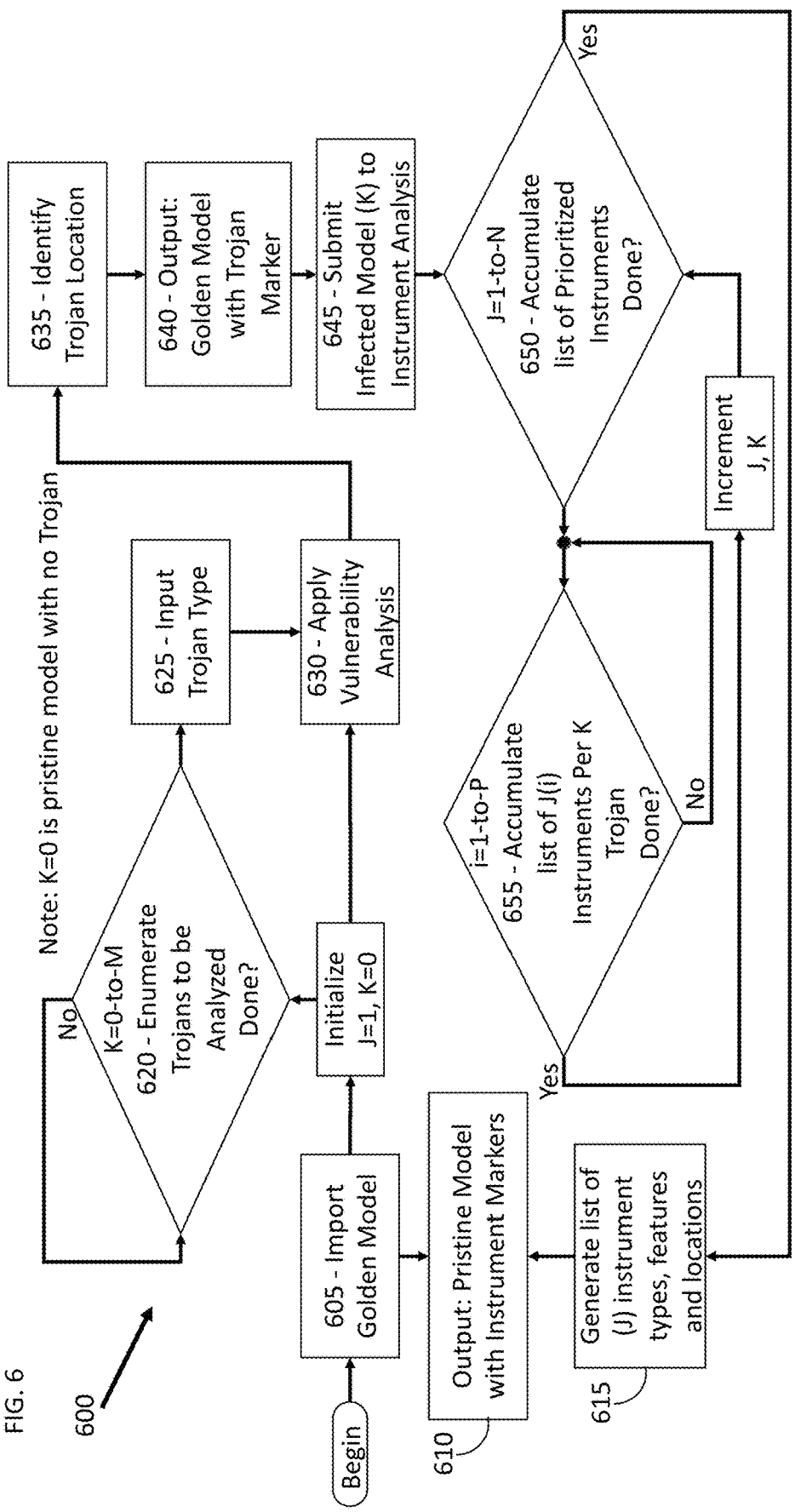
FIG. 6 is a simplified flow diagram of a method for generating a pristine markered version of an instrumented model of an electronic facility, in an embodiment.

FIG. 6 illustrates in an embodiment a method 600 described in a flow diagram of generating a pristine model file (defined as one with no Trojan added by the current vulnerability analysis) and a plurality of infected model files that contain one Trojan each (to meet the analysis directive of single-Trojan-assumption). Any given Vulnerability Analysis 630 may encompass an exploration of one to any number of Trojans. As shown in FIG. 6, the enumeration of Trojans are bounded by the incrementing of variable K from 0 (the pristine no Trojan index) to M (the maximum number of Trojans being considered). Each Trojan is submitted to a Vulnerability Analysis to identify the most ideal location for the Trojan attack. Once the Trojan attack and location are identified by Vulnerability Analysis 630, then a further Instrument Analysis 645 of the model can determine the best location to place instruments to either directly detect the attack, or to provide learning of the features and functions that the attack will impact. The Instrument Analysis 645 will provide instrument types and locations and the instruments will be tracked by variable J that ranges from 1 to N. It must be noted that a single Trojan K may require several instruments J(i) in order to provide adequate detection or recognition. When all of the Trojans have been processed, then a full list 615 of instruments J and J(i) exists that describes the instrument types, features, and locations. Referring to FIG. 6, this list 615 may be applied to the original pristine model to generate 610 a copy of the original pristine model that contains instrument markers. This model 610 may then be used to generate instrument-marked infected Trojan-marked models that can be used in the emulation, operation and data collection process.

Figure 7:
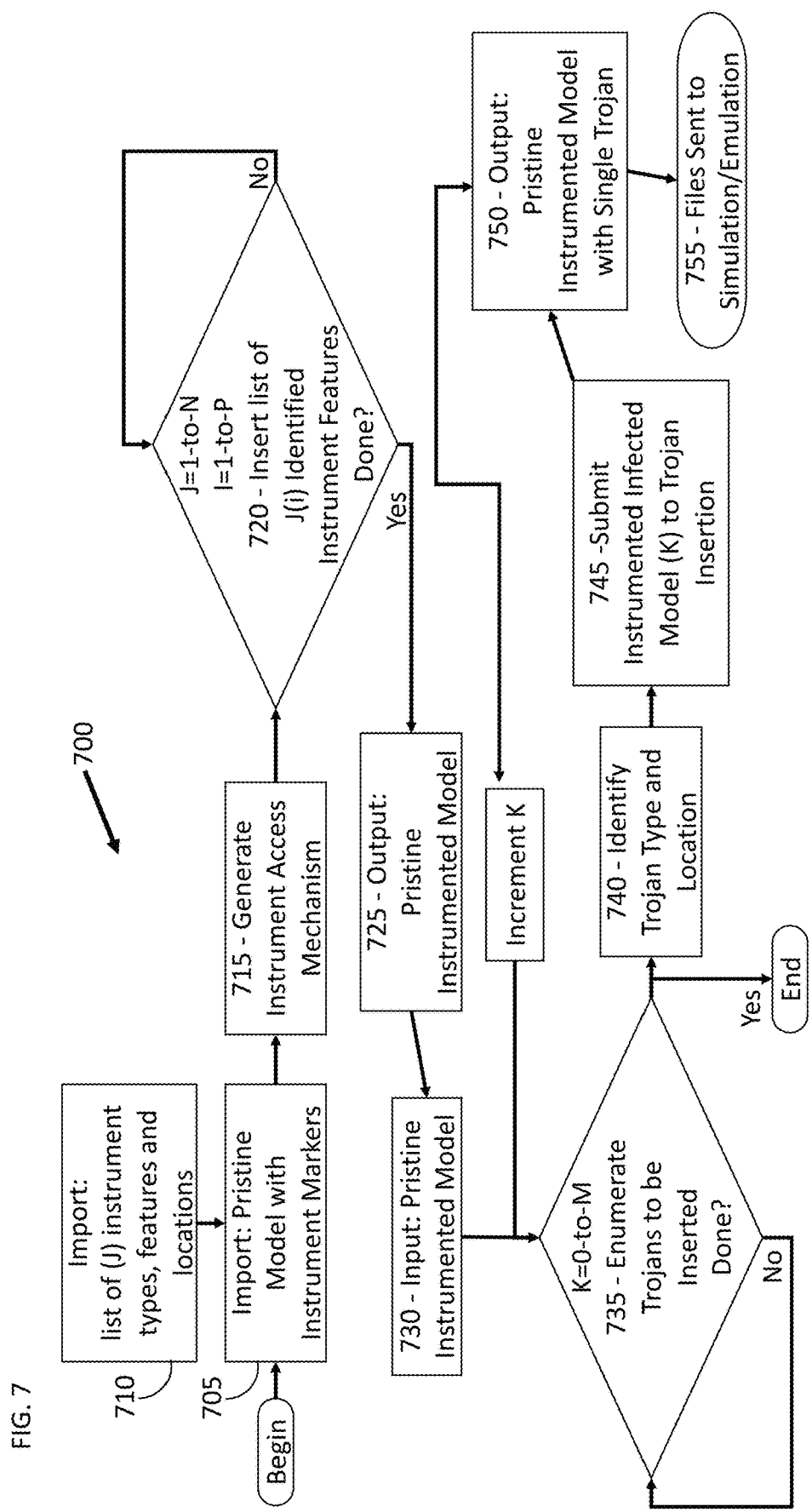
FIG. 7 is a simplified flow diagram of a method for generating multiple infected instrumented models of an electronic facility, in an embodiment.

FIG. 7 illustrates in an embodiment a method 700 of generating a model that contains an instrument access network and embedded instruments, using an instrument-marked model. Method 700 may begin with importing the output of the method 600 described in FIG. 6, including the list 710 of instruments to be attached to the markers in the pristine model with instrument markers 705. From this list 710, the pristine model is modified to incorporate all of the identified instruments and to attach them to the correct markers. The method 700 includes installing 720 all instruments by enumerating all J and J(i) indexed instrument features. Method 700 includes outputting an instrumented pristine model 725. An insertion process that uses the same variable K, ranging from 0 to M, from the process described in FIG. 6 is indexed to generate 750 a plurality of M+1 files that represent a pristine instrumented file and M instrumented infected files. These files can then be submitted 755 one at a time to an emulation process where the hardware is programmed into an emulator, operational vectors are applied, and data is collected to be submitted to machine learning analysis.

Figure 8A:
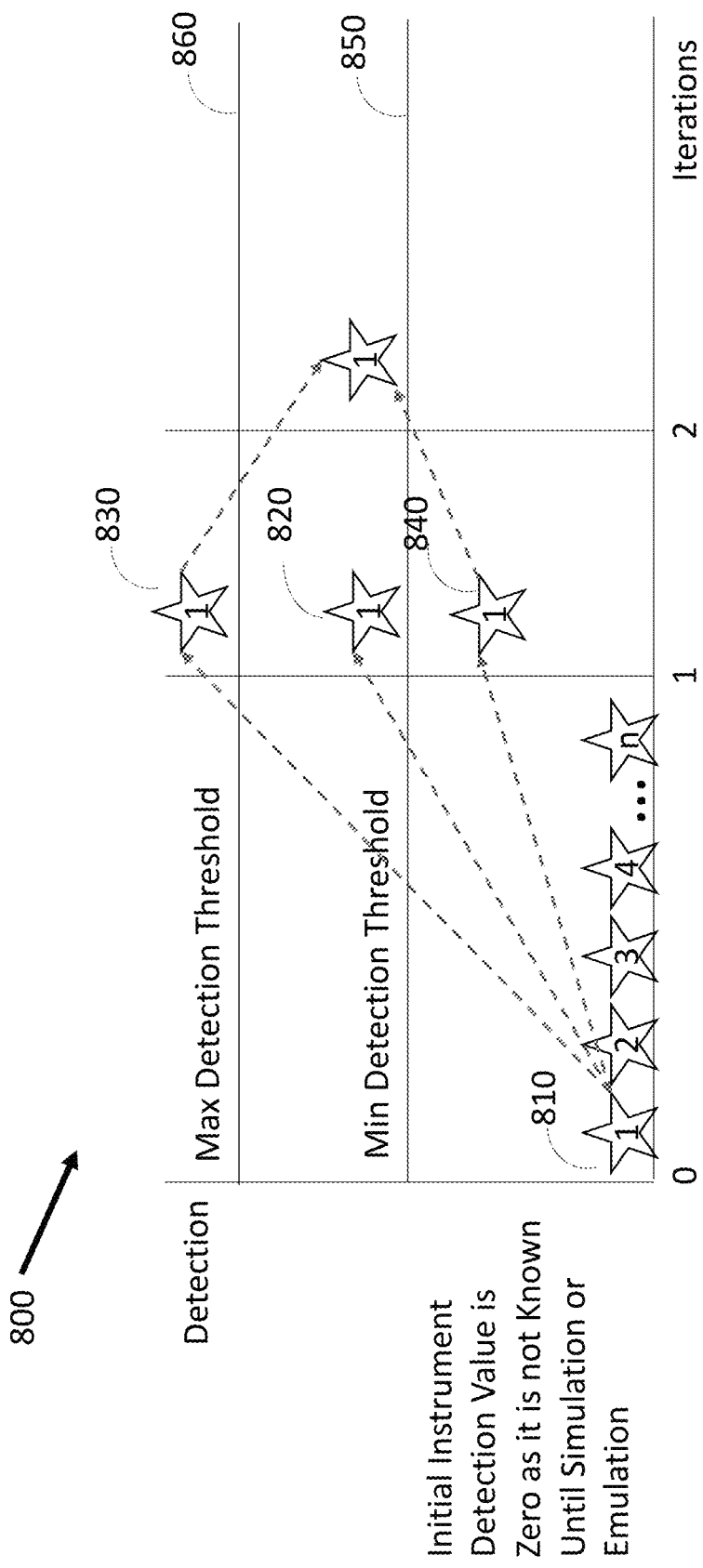
FIG. 8A is a first simplified graphical representation illustrating a minimal instrument trojan detection architecture in relation to detection metrics in an embodiment.

Creating the instrument architecture network, as shown generally in FIGS. 4A, 4B, 5A, 5B, may include at least two initial instrument architectures. In one exemplary embodiment the instrument architecture, consisting of the instruments and their access mechanism, may represent the minimum necessary set of instrument features such as simple capture registers with a sparse distribution in order to meet a cost budget (where cost represents silicon area, power consumption impact, the time and effort to modify the design or other well known in the art drivers). FIG. 8A illustrates an embodiment of the instrumentation method 800 known as start small. In another exemplary embodiment shown in FIG. 8B, the instrument architecture may be created to represent a widely overlapping distribution of full-featured instruments that target a high probability of detection as opposed to targeting minimum cost impact. The embodiment illustrated in FIG. 8B is an instrumentation method known as start big.

After the instrument architecture has been created, the instruments have no actual detection rating until they have been used and measured against the ability to detect Trojans. In order to provide a rating or metric for the instruments, Trojans must be inserted into the instrumented model and the data collected by the instruments must be extracted and provided to a validating evaluation process such as machine learning analysis.

Figure 9A:
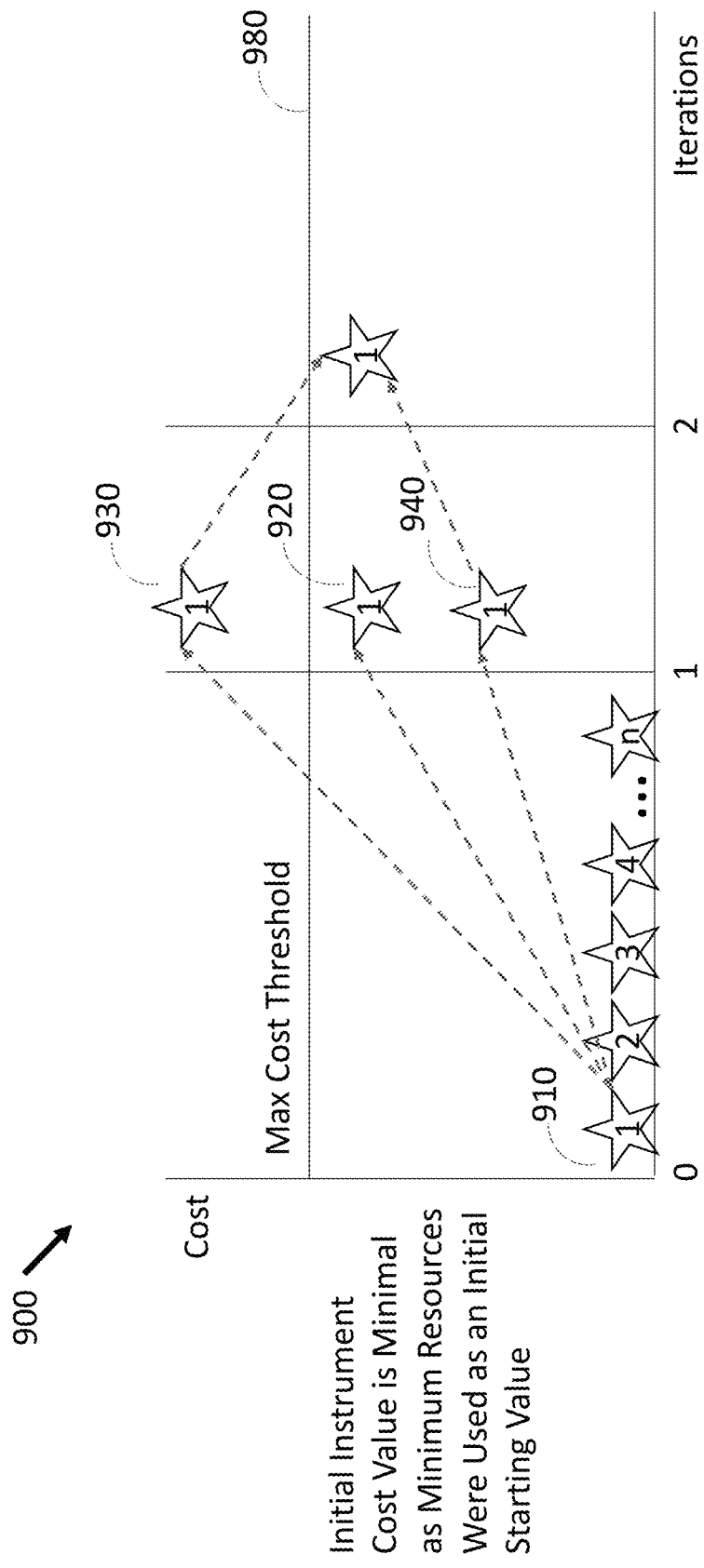
FIG. 9A is a first simplified graphical representation illustrating a minimal instrument trojan detection architecture in relation to cost metrics in an embodiment.

As the instrumented model is operated in training mode in such a way as to provide training data that represents normal operation, a data collection schedule is imposed (sampling frequency) and the collected data is fed to machine learning. At some point during the training in training mode, a Trojan is triggered and activated, and this data is also fed to the machine learning analysis. The machine learning then processes the data and can provide very specific metrics regarding the ability to detect the Trojan through the collected data variables. Data variables are directly associated to the included instrument features used within the instrumented model to collect data. Therefore, the machine learning provides metric information about the instrument features. FIG. 8A illustrates in the start small embodiment the metric of an instrument being measured against a detection level. The instruments after insertion have detection ratings of zero because they have not been used yet. The index on the vertical axis is detection, where metrics of note may be the level associated with minimum necessary detection and maximum desired detection; the index on the horizontal axis represents the iterations of operation of the instruments and analysis of the instrument as rated by the machine learning process. In an embodiment, the machine learning analysis will provide a detection confidence percentage and moves the instrument rating into interval 1, for example if this operation results in a measured rating of 64 percent for an instrument 810. If the desired detection confidence percentage is 92 percent 860, or the desired detection interval is between 82 percent 850 and 92 percent 860, then the current instrument architecture is insufficient without changes (i.e. 64 percent detection is represented by star-1 840 that is below the minimum detection threshold). In addition to providing a detection confidence percentage, the machine learning analysis may also provide the individual contribution that each variable provides toward that metric. This provides a link back to identify which instruments are effective, which are not effective, and which are not involved at all. With the start small instrument architecture, it is fully expected that the detection rating will be insufficient compared to the required threshold and the instruments will need to be enhanced in order to raise the detection confidence percentage. However, in some cases, the metric returned from machine learning analysis may show the instrument has exceeded the desired detection capability 830, has met the desired detection capability 820, or still falls short of the desired detection capability 840. Changes can be made to the instruments, the model can be operated again, and Trojans can be inserted with data collection and the subsequent machine learning analysis evaluation. When this data is returned and applied to the metric system, then the instruments are moved horizontally to iteration interval 2. The goal is that the changes to any individual instrument or to a plurality of instruments in the instrument network place the instrument's detection rating clearly in the ideal desired detection range. In this way, the design can be changed and the instruments can evolve over iterative operations to achieve the ideal desired detection rating. This is important since the size, timing impact and thermal and power footprint of the instrument are concerns and will apply limits to the implemented instrument architecture. It is anticipated that an instrument that exceeds the necessary detection percentage would be too large and could be reduced in size or complexity to reduce the cost impact. Instruments that are too low in detection percentage can either be enhanced to meet the requirement or removed completely if the cost assessment has been exceeded. FIG. 9A illustrates in the start small embodiment 900 the metric of an instrument being measured against a cost level. The actual metric operation to make decisions on the features, functions and configurations of instruments depends on the application of both the metric analysis systems of the start small embodiment (shown in FIGS. 8A and 9A).

FIG. 8B illustrates in the start big embodiment 805 the metric of an instrument being measured against a detection level, and in association with FIG. 9B which illustrates in the start big embodiment 905 the metric of an instrument being measured against a cost level, that may produce similar results to the previous discussion of metrics for the start small embodiments 800, 900 shown in FIGS. 8A and 9A. With the start big instrument architecture, an overabundance of full-featured instruments are used to create the initial implementation. It is expected that the detection rating will easily achieve the desired confidence detection percentage, but that the instruments will exceed the cost threshold and will need to be reduced in size or functionality in order to meet the cost budget. The evolution of the instrument architecture based on starting with the start big embodiment and applying a detection and cost analysis is primarily focused to reduce the instrument architecture to meet the necessary cost requirement. It is noted that the machine learning must process several different Trojans to provide a comprehensive feedback package on the complete instrument architecture. As the results accumulate, the impact of individual instruments toward the individual detection confidence percentage for each Trojan can be ascertained, as can the overall detection confidence percentage for the entirety of injected Trojans.

Figure 10:
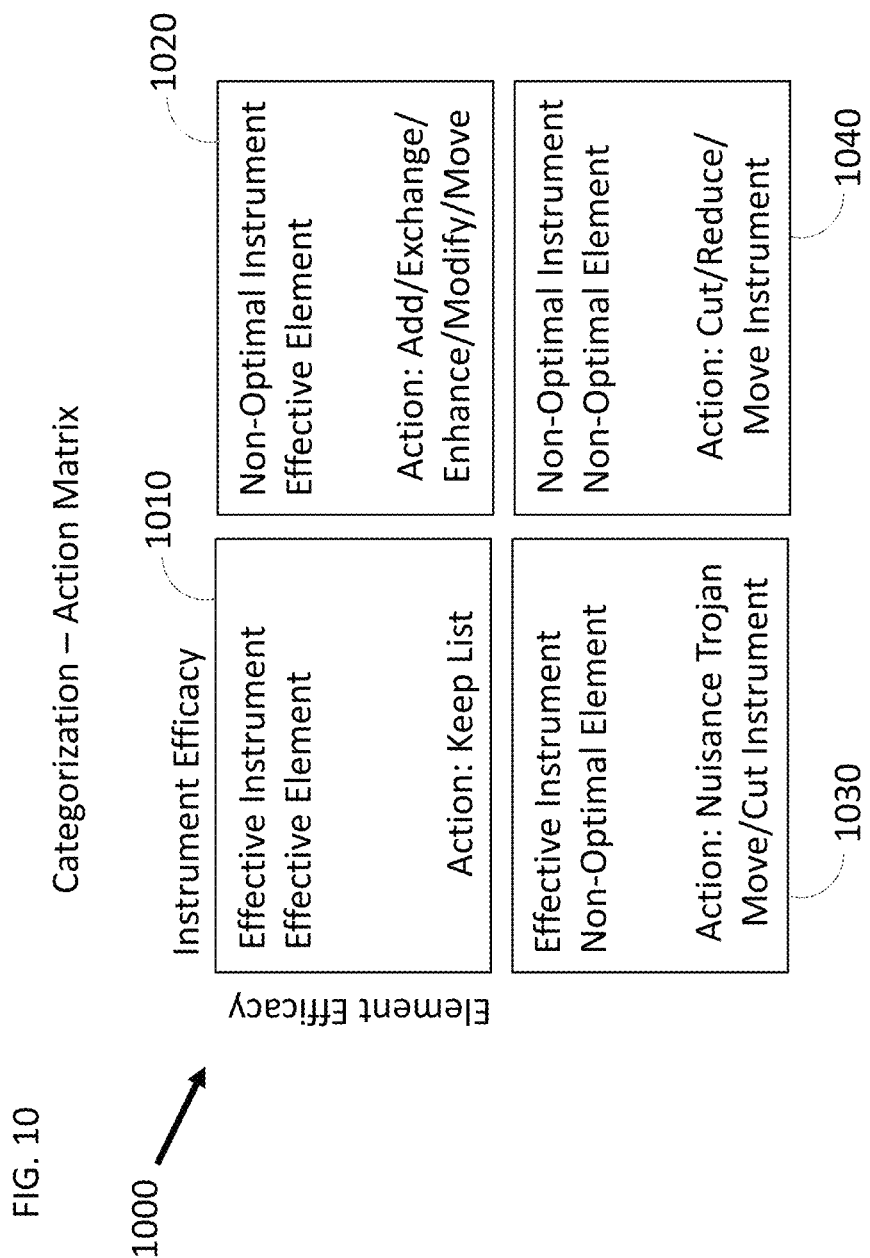
FIG. 10 is a simplified graphical representation illustrating an action-categorization matrix in an embodiment.

After the machine learning analysis has been accomplished and produces the metrics associated with the detection percentages and the list of instruments that contributed to the detection percentages, and further, when an additional stage of the machine learning also produces metrics associated with the attack recognition percentages and the list of instruments that contributed to the attack recognition percentages, then this information can be applied in a feedback process to generate the next iteration in the graphs shown in FIGS. 8A, 8B, 9A, 9B. An analysis of the applicable graph (depending on the type of beginning condition, start small embodiment 800, 900 or start big embodiment 805, 905) can then be used to drive an instrument efficacy categorization that produces the actions of how to resolve the configuration state of the various instruments. FIG. 10 shows a categorization-action matrix that basically defines the actions to be accomplished if identified instruments are meeting their detection and cost goals or are not meeting either their detection goals or their cost goals. Sometimes the instruments are correct, but not matched to the Trojan attack effect and sometimes the instruments are mismatched to their task and the Trojan attack effect is not ideal (for example, a machine learning instrument will not train correctly if a signal is designed to remain a logic 0 for its entire life except for a transition to a logic 1 for only a few milliseconds once out of a long period of time such as a decade).

FIG. 10 illustrates such a Categorization-Action Matrix which is, particularly, a Four-Square Matrix. The horizontal axis of the matrix represents the instrument's efficacy with good efficacy on the left and bad or mismatched efficacy on the right. The vertical axis represents the efficacy of the Trojan attack (meaning, does the Trojan or selected attack location produce data or physical effects that are adequate and that contribute to detection or learning or does the Trojan or selected attack location produce very little in the way of monitorable results?). The feedback from the machine learning process produces results that fall into one of the four categories in the matrix. Feedback of detection and recognition contributors, having been passed through the appropriate graphing in FIGS. 8A and 9A or 8B and 9B can then be placed in the Four-Square matrix. An instrument that ends up in the upper-left quadrant 1010 of the matrix 1000 has an instrument that is ideally suited to monitor the attack and attack location and the attack at the selected location being monitored is well-conditioned and produces good data (i.e., the instrument and Trojan attack are well-matched). In this case, the action is to keep the instrument by placing it on the keep list.

Referring to FIG. 10, an instrument that ends up in the upper-right quadrant 1020 of the matrix 1000 has an instrument that is mismatched for the Trojan attack the instrument is monitoring. However, the Trojan attack at the selected Trojan location is shown to be producing data variable responses that are fully adequate to be used for training and prediction of a machine learning process. The action for this case is to either make the instrument better by modification or enhancement, change the instrument or to change the instrument location. The action, therefore, is to add the instrument to the modify list that includes actions such as add, exchange, modify, enhance and move.

Referring to FIG. 10, an instrument that ends up being categorized into the lower-right quadrant 1040 of the matrix 1000 has a complete mismatch in that the instrument is mismatched for the task required and the Trojan attack or attack location is badly conditioned. Since all parts of the analysis must be reconsidered, the action for this case is to remove or cut the instrument (and in many cases, to also disregard the Trojan attack or to reconsider the attack location). Instruments in this categorization space in the matrix are place on the modify list to be cut or removed.

Referring to FIG. 10, an instrument that is categorized in the lower-left quadrant 1030 of the Four-Square matrix 1000 has an effective instrument, but a badly conditioned Trojan attack or attack location. However, even with a badly conditioned Trojan, the instrument proved to be effective. In many cases, the Trojan attack can be rendered into the nuisance category of severity which lowers its cost-consideration significantly and in a cost-conscious environment may remove it from consideration, which renders support for instrumentation moot. This instrument may be moved to a location where it is more apt to be useful, or the instrument, even though it is effective, may be cut or removed. The action is to place this instrument on the modify list to be cut or removed.

Figure 11:
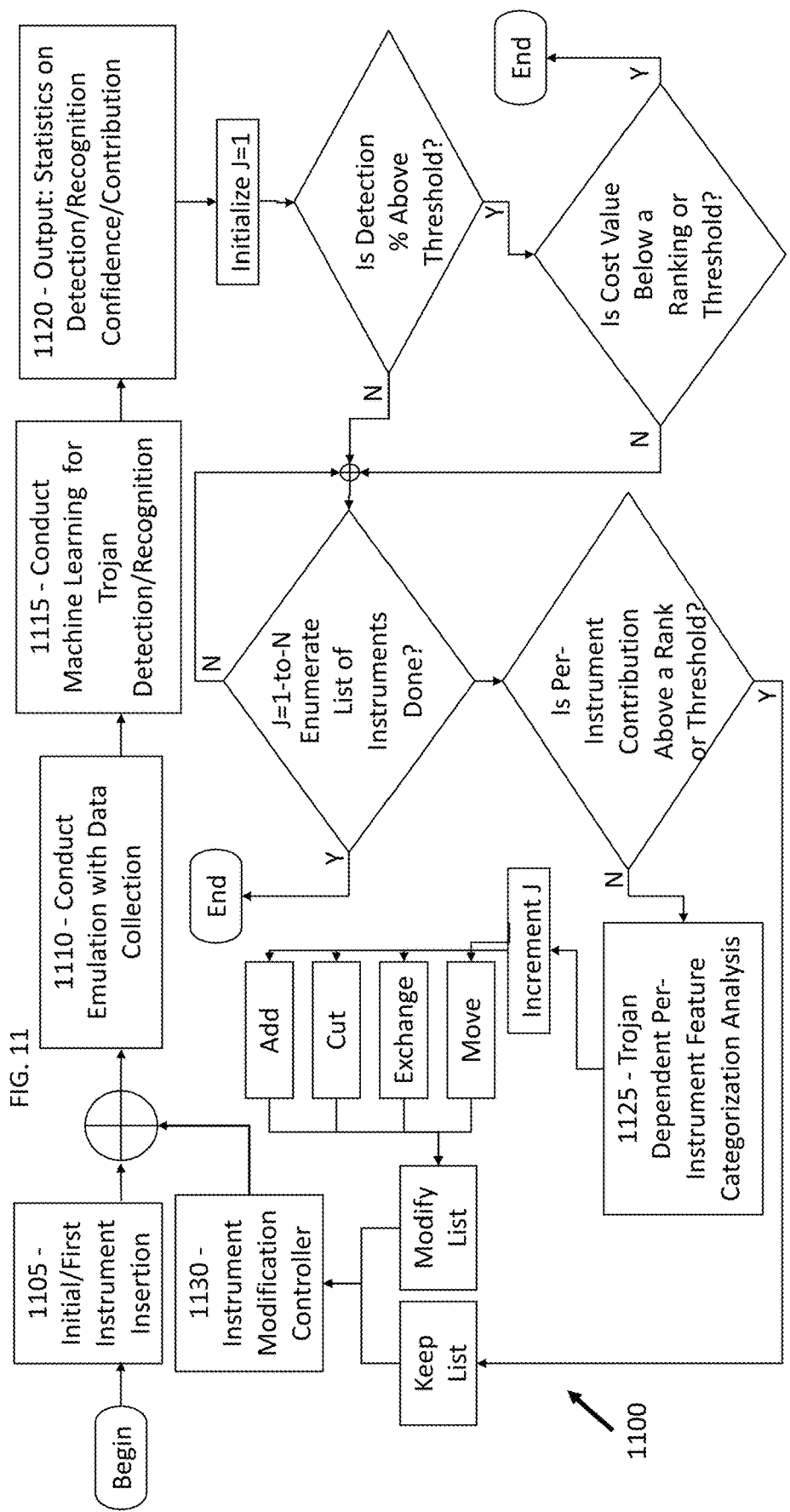
FIG. 11 is a simplified flow diagram of a method for optimization of instrumentation of an electronic facility based on machine learning feedback based on the processing of detection statistics of data provided by said instrumentation in an embodiment.

FIG. 11 shows method 1100 for the evaluation and modification of all embedded instruments to be used for cybersecurity within a design, in an automated flow. FIG. 11 may begin with initial insertion 1105 that may represent start small or may represent start big (in this illustration, only one is selected, but it is possible to support a hybrid of both instrumentation insertion types). The pristine and plurality of infected files can then be emulated 1110 and operated with data collection from the instruments to allow machine learning 1115 to analyze the results and to produce 1120 the feedback statistics on the instruments across a whole spectrum of Trojan attacks distributed in different locations within the design. The whole of method 1100 may be first resolved to metrics to identify if the detection percentage for each of the plurality of Trojan attacks meets the target detection percentage. If so, then the whole design may be weighed against the cost budget. If the detection percentage is above the threshold and the cost budget is below the set threshold, then the process is complete and the instrument architecture stands as is with no modification needed. However, if the detection percentage is not above the set threshold or if the detection percentage is above the threshold, but the cost budget is not, then the flow moves to enumerating the instrument one at a time and passing them through the graphs illustrated in FIGS. 8A and 9A or FIGS. 8B and 9B to identify the placement of each instrument by contribution with respect to the threshold. The enumeration thus enables categorization 1125 to place each instrument into the Four-Square categorization regime shown in FIG. 10. As each instrument is processed, it is placed on either the Keep List if the individual instrument meets the detection, recognition and cost goals, or the instruments are resolved to the Modify List. Method 1100 may include feeding back the resolution of each instrument to the instrument modification controller 1130 and then to the instrument insertion process to allow the instrument network to be updated. Method 1100 may include operating the instrument insertion process as often as needed until the detection, recognition and cost goals are met.

Thus, it will be apparent to one of ordinary skill that this disclosure provides for improved methods, systems, and apparatus for security assurance, protection, monitoring and analysis of facilities and electronic systems including circuits, such as integrated circuits, in relation to hardware trojans.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above-described embodiment, method, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

Terminology used in the present disclosure is intended to include all environments and alternate technologies that provide the same functionality described herein.

What is claimed is:

1. A computer implemented method for securing an electronic facility in relation to a trojan, said method comprising the steps of:
    first providing a facility structural and functional description, register transfer language (RTL) model or netlist model;
    first performing a trojan vulnerability analysis of the facility in relation to the trojan in relation to the facility structural and functional description, RTL model or netlist model to provide a trojan location analysis output;
    first determining a selected instrument in relation to an effect produced by the trojan, the selected instrument comprising selected instrument information, the selected instrument information comprising control-side instrument information including control-side connections, the selected instrument information comprising operative-side instrument information including operative-side connections;
    first defining instrument control-side markers on the control-side connections of the selected instrument; and
    second defining instrument operative-side markers on the operative-side connections of the selected instrument.

2. The computer implemented method according to claim 1, said method further comprising the steps of: second performing an instrument location analysis of the facility in relation to the facility structural and functional description, RTL model or netlist model in relation to the trojan location analysis output to provide an instrument location analysis output.

3. The computer implemented method according to claim 1, said method further comprising the steps of: third defining access architecture control-side markers at control-architecture points.

4. The computer implemented method according to claim 1, said method further comprising the steps of: fourth defining facility operative-side markers at monitor points of the facility structural and functional description, RTL model or netlist model.

5. The computer implemented method according to claim 1, said method further comprising: in said first providing, the facility structural and functional description, RTL model or netlist model comprising a Golden Model.

6. The computer implemented method according to claim 1, said method further comprising the steps of: first generating, by a first tool process, an access architecture.

7. The computer implemented method according to claim 6, said method further comprising the steps of: first associating, by the first tool process, an access architecture with the selected instrument.

8. The computer implemented method according to claim 7, said method further comprising the steps of: first connecting, by the first tool process, the selected instrument to the access architecture by matching access architecture control-side markers to the instrument control-side markers.

9. The computer implemented method according to claim 1, said method further comprising the steps of: second connecting, by a second tool process, the selected instrument to the facility structural and functional description, RTL model or netlist model by matching facility operative-side markers to the instrument operative-side markers.

10. The computer implemented method according to claim 2, said method further comprising the steps of: in said second performing, the instrument location analysis output comprising a selected instrument location determined in relation to an effect produced by the trojan.

11. The computer implemented method according to claim 1, said method further comprising the steps of: the selected instrument comprising a machine learning instrument.

12. The computer implemented method according to claim 1, said method further comprising the steps of: infecting the facility model by inserting the trojan in relation to the trojan location analysis output; emulating, on an emulation platform, the facility model, the selected instrument inserted in the facility model, and the trojan inserted in the facility model, to provide emulation output.

13. The computer implemented method according to claim 1, said method further comprising the steps of: evaluating efficiency of the selected instrument.

14. The computer implemented method according to claim 13, said method further comprising the steps of: evaluating efficiency of the selected instrument in relation to the emulation output.

15. The computer implemented method according to claim 1, said method further comprising the steps of: evaluating cost effectiveness of the selected instrument in relation to evaluating efficiency of the selected instrument.

16. The computer implemented method according to claim 15, said method further comprising the steps of: evaluating cost effectiveness of the selected instrument in relation to evaluating efficiency of the selected instrument in relation to the emulation output.

17. A computer implemented trojan security system configured to perform the method of claim 1.

18. An electronic design software application comprising a computer implemented trojan security system configured to perform the method of claim 1.

19. A non-transitory computer-accessible medium having stored thereon computer-executable instructions for securing an electronic facility in relation to a trojan, wherein, when a computer hardware arrangement executes the instructions, the computer hardware arrangement is configured to perform procedures comprising:
first providing a facility structural and functional description, RTL model or netlist model;
first performing a trojan vulnerability analysis of the facility in relation to the trojan in relation to the facility structural and functional description, RTL model or netlist model to provide a trojan location analysis output;
first determining a selected instrument in relation to an effect produced by the trojan, the selected instrument comprising selected instrument information, the selected instrument information comprising control-side instrument information including control-side connections, the selected instrument information comprising operative-side instrument information including operative-side connections;
first defining instrument control-side markers on the control-side connections of the selected instrument; and
second defining instrument operative-side markers on the operative-side connections of the selected instrument.

20. A computer implemented method for securing an electronic facility in relation to a trojan, using a computer implemented trojan security system, said method comprising the steps of:
first providing a facility model;
first performing a trojan vulnerability analysis in relation to the trojan in relation to the facility model;
first determining a selected instrument in relation to an effect produced by the trojan, the selected instrument comprising selected instrument information, the selected instrument information comprising control-side instrument information including control-side connections, the selected instrument information comprising operative-side instrument information including operative-side connections;
first defining instrument control-side markers on the control-side connections of the selected instrument; and
second defining instrument operative-side markers on the operative-side connections of the selected instrument.

* * * * *